(12) United States Patent
Deter et al.

(10) Patent No.: US 9,189,636 B2
(45) Date of Patent: Nov. 17, 2015

(54) OFFICE MACHINE SECURITY POLICY

(75) Inventors: Matthew Lee Deter, Rocklin, CA (US);
Douglas T Albright, Rocklin, CA (US);
Kimberly G Drongesen, Granite Bay,
CA (US); John K Gonsalves, Roseville,
CA (US); John P. Borz, Roseville, CA
(US); John Bigley, Auburn, CA (US);
Kathleen M Takayama, Rocklin, CA
(US); Jeffrey H Soesbe, Sacramento,
CA (US); Daryl Wong, Sacramento, CA
(US)

(73) Assignee: **HEWLETT-PACKARD
DEVELOPMENT COMPANY, L.P.**,
Houston, TX (US)

( * ) Notice: Subject to any disclaimer, the term of this patent is extended or adjusted under 35 U.S.C. 154(b) by 248 days.

(21) Appl. No.: 13/561,644

(22) Filed: Jul. 30, 2012

(65) Prior Publication Data
US 2014/0029039 A1    Jan. 30, 2014

(51) Int. Cl.
*G06F 21/60* (2013.01)
*G06F 21/45* (2013.01)
*H04L 29/06* (2006.01)

(52) U.S. Cl.
CPC .............. *G06F 21/604* (2013.01); *G06F 21/45* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 5,720,012 A | 2/1998 | McVeigh et al. | |
| 6,484,261 B1 | 11/2002 | Wiegel | |
| 6,678,827 B1 * | 1/2004 | Rothermel et al. | 726/6 |
| 7,143,210 B2 | 11/2006 | Ferlitsch | |
| 7,581,241 B2 | 8/2009 | Bassett et al. | |
| 7,869,071 B2 | 1/2011 | Liu | |
| 8,056,124 B2 | 11/2011 | Bassett et al. | |
| 8,056,140 B2 | 11/2011 | Fukuta | |
| 8,117,461 B2 | 2/2012 | Bigelow, Jr. et al. | |
| 2005/0102442 A1 | 5/2005 | Ferlitsch | |
| 2008/0007760 A1 | 1/2008 | Kimura | |

(Continued)

FOREIGN PATENT DOCUMENTS

JP    2012053510    *    3/2012

OTHER PUBLICATIONS

Paul Anderson et al., "SmartFrog meets LCFG: Autonomous Reconfiguration with Central Policy Control," Proceedings of the 17th Large Installation Systems Administration Conference, Oct. 26-31, 2003, San Diego, California, USA, pp. 1-15, Available at: <static.usenix.org/events/lisa2003/tech/full_papers/anderson/anderson_html/>.

(Continued)

*Primary Examiner* — Fan Zhang
(74) *Attorney, Agent, or Firm* — Mahamedi Paradice LLP

(57) ABSTRACT

An example system can comprise a memory to store machine readable instructions. The system can also comprise a processing unit to execute the machine readable instructions. The machine readable instructions can comprise a service layer to generate an office machine security policy for a heterogeneous fleet of office machines. The heterogeneous fleet of office machines can comprise two different office machines. The service layer can also generate a security configuration for each office machine of the office machine fleet. The security configuration for a given office machine of the heterogeneous fleet of office machines can comprise a security setting for the given office machine. The machine readable instructions can comprise can also comprise a device layer to translate the security configuration of the given office machine into security instructions that are executable by the given office machine.

20 Claims, 17 Drawing Sheets

(56) References Cited

U.S. PATENT DOCUMENTS

| | | | |
|---|---|---|---|
| 2008/0062454 A1 | 3/2008 | Bostick et al. | |
| 2008/0252910 A1* | 10/2008 | Cordesses et al. | 358/1.1 |
| 2009/0007224 A1 | 1/2009 | Aso et al. | |
| 2010/0043052 A1* | 2/2010 | Park et al. | 726/1 |
| 2011/0191817 A1 | 8/2011 | Oh et al. | |
| 2011/0242569 A1* | 10/2011 | Ohara | 358/1.13 |
| 2013/0016388 A1* | 1/2013 | Amano | 358/1.14 |
| 2014/0029039 A1 | 1/2014 | Deter et al. | |

OTHER PUBLICATIONS

Cisco Systems, Introduction [Cisco PIX Firewall Software], (Web Page) retrieved on Dec. 19, 2013, available at http://www.cisco.com/en/US/docs/security/pix/pix42/configura.

Closing the Print Security Gap, (Research Paper), Oct. 2011, available at http://www.canon.de/Images/Quocirca_Print_Security_2011_Final_Oct_2011_Public_Summary_tcm83-89065.

Hewlett-Packard Development Company, L.P., HP Web Jetadmin software, (Web page), Mar. 23, 2009, <http://web.archlve.org/web/20090323120856/http://www.hp.com/united-states/we.

Ricoh, "HP Web Jetadmin Briefing Paper," Nov. 2005.

Anderson, P. et. al., "SmartFrog meets LCFG: Autonomous Reconfiguration with Central Policy Control," Proceedings of the 17th Large Installation Systems Administration Conference, Oct. 2003, available at: http://static.usenix.org/events/lisa2003/tech/full_papers/anderson/anderson_html/.

* cited by examiner

114

OFFICE MACHINE SECURITY POLICY

BACKGROUND

An MFP (Multi Function Product/Printer/Peripheral), multifunctional, all-in-one (AIO), or Multifunction Device (MFD), can be an office machine which incorporates the functionality of multiple devices in one, so as to have a smaller footprint and/or to provide centralized document management, distribution and/or production in an office setting. An MFP can act as a combination of some or all of a printer, a scanner, a photocopier, a fax machine and an e-mail client.

In computing, a security policy can be a set of rules that are enforced by organizational policies and/or security mechanisms. A technical implementation of a security policy defines whether a system is secure or unsecure.

DETAILED DESCRIPTION

An office machine security policy can be administered to a fleet of office machines (e.g., printers or image devices). The same security policy can be automatically configured for each office machine of the fleet of office machines by a service layer of a security control to generate a security configuration for each office machine. Additionally, a device layer of the security control can translate the security configuration for each office machine into a set of instructions executable by a respective office machine to implement the office machine security policy. Administration of the office machine security policy in this manner can reduce and/or eliminate security holes that would be present in an unsecured environment. Moreover, the office machine security policy can be administered to a large number of office machines, thereby obviating the need to set security settings for each office machine individually.

Figure 1:
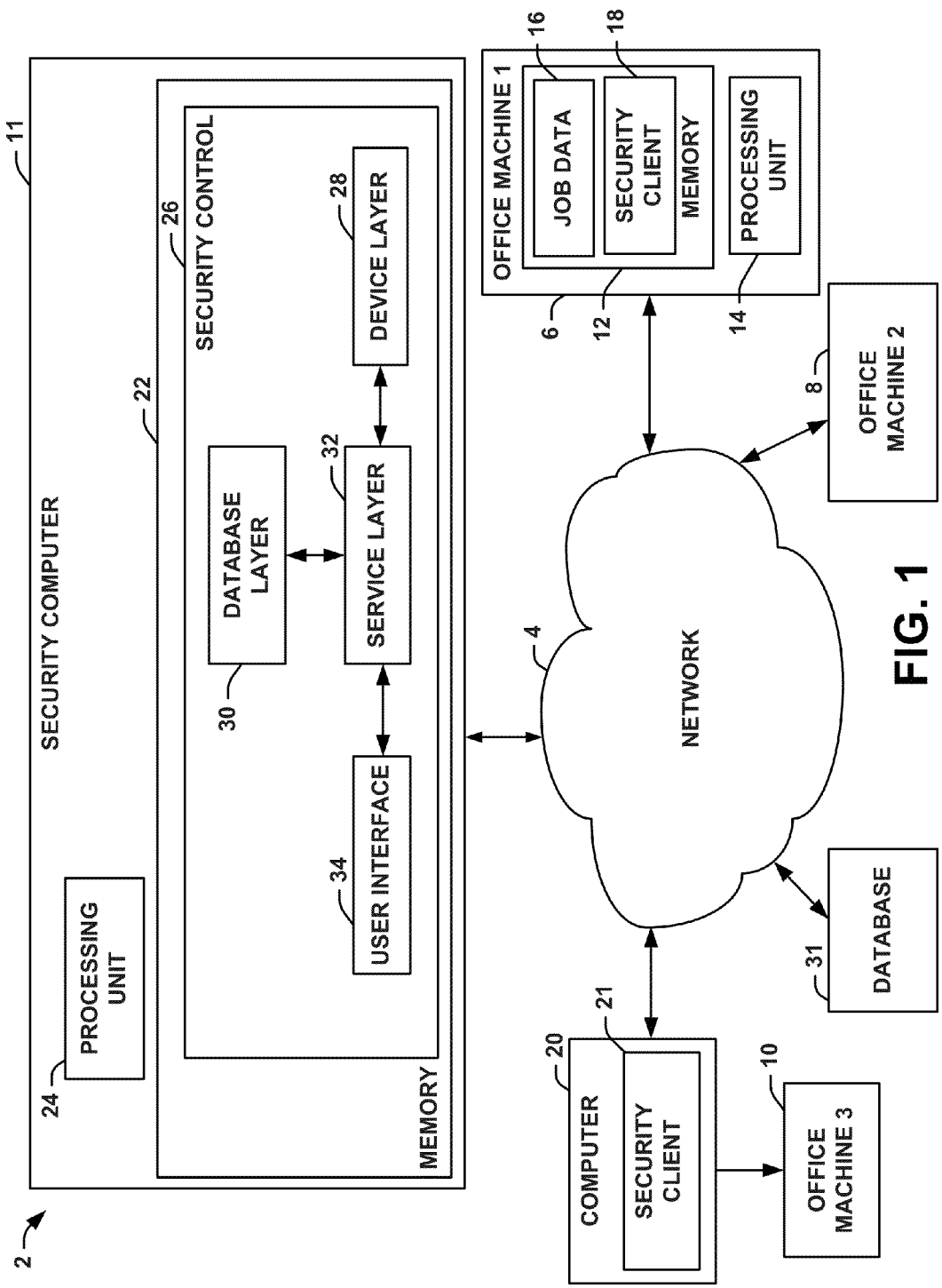
FIG. 1 illustrates an example of a system for administering an office machine security policy.

FIG. 1 illustrates an example of a system 2 for administering an office machine security policy on an office machine fleet over a network 4. The office machines of the office machine fleet can be implemented as printers, image devices (e.g., scanners, copiers) or some variation thereof, such as an MFP (Multi Function Product/Printer/Peripheral). In the example of FIG. 1, three office machines of the fleet of office machines are illustrated, namely a first office machine 6 (labeled in FIG. 1 as "OFFICE MACHINE 1"), a second office machine 8 (labeled in FIG. 1 as "OFFICE MACHINE 2") and a third office machine 10 (labeled in FIG. 1 as "OFFICE MACHINE 3"). In other examples more or less office machines can be employed in a given fleet. As used herein, the term "printer" includes any office machine that provides printing capabilities, including an office machine that provides other functions as well (e.g., e-mailing, web browsing, faxing, scanning or the like). In some examples, the office machine fleet can be a heterogeneous fleet of office machines, such that some of the office machines may be different types (e.g., different models or different kinds) of machines.

The network 4 can be implemented, for example, as a public network (e.g., the Internet) a private network (e.g., the local area network, a cellular data network or the like) or a combination thereof. For purposes of simplification of explanation, in the present example, different components of the system 2 are illustrated and described as performing different functions. However, in other examples, the functionality of several components can be combined and executed on a single component. The components can be implemented, for example, as software (e.g., machine executable instructions), hardware (e.g., an application specific integrated circuit), or as a combination of both (e.g., firmware). In other examples, the components could be distributed among remote devices across the network 4 (e.g., external web services).

The first office machine 6 can be an MFP that can communicate with a security computer 11 over the network 4. Security settings for the first office machine 6 can be set via a security protocol, such as the Simple Network Management Protocol (SNMP), the Web Services Protocol, the Web Services Transfer Protocol or the like. The first office machine 6 can include functionality, for example, for printing, scanning, faxing, copying, e-mailing, web surfing or the like.

In some examples, the first office machine 6 can include a non-transitory memory 12 to store machine readable instructions and/or data. The memory 12 could be implemented, for example as volatile memory (e.g., RAM), nonvolatile memory (e.g., a hard disk, flash memory, a solid state drive or the like) or combination of both. The first office machine 6 can also include a processing unit 14 (e.g., a processor core) for accessing the memory 12 and executing the machine-readable instructions. Accordingly, the first office machine 6 can have functionality of a computer. In some unsecured environments, any computer communicating on the network 4 can generate a job (e.g., a print job) for the first office machine 6. The job can be stored, for example, as job data 16 in the memory 12. The job data 16 can include, for example, print jobs, copies of scanned documents, or the like.

Moreover, in some unsecured environments, any computer communicating on the network 4 could access the job data 16. However, such uncontrolled access to the job data 16 can create a security risk. For instance, sensitive documents scanned by the office machine may be accessed by an unauthorized user (e.g., a hacker) in an unsecured environment. Accordingly, the memory 12 of the first office machine 6 can include a security client 18 that communicates with the security computer 11 via the network 4 to manage security settings to prevent unauthorized access and use of the first office machine 6 in a manner described herein.

In some examples, the second office machine 8 can be implemented, for example, as a legacy network office machine. The second office machine 8 can include functional features similar or different to the first office machine 6. For instance, in some examples, the second office machine 8 can also be a MFP. In other examples, the second office machine 8 can be a conventional printer that is limited to printing. In an unsecured environment, the second office machine 8 can pose similar or different security risks as the first office machine 6. Accordingly, security settings for the second office machine 8 can be set via a security protocol, such as the security protocol employed by the first office machine 6. In some examples, the second office machine 8 may not have a security client (e.g., the security client 18 of the first office machine 6) to communicate with the security computer 11. In such a situation, the security computer 11 can manage the security settings of the second office machine 8 in a manner described herein.

As a further example, the third office machine 10 can communicate directly with a computer 20. The third office machine 10 can communicate with the computer 20 over a direct connection, such as a universal serial bus (USB) communication port. The third office machine 10 can be a legacy office machine. In some examples, the third office machine 10 can include functionality similar to the first office machine 6, while in other examples, the third office machine 10 can be an office machine with relatively limited functionality. In an unsecured environment, the third office machine 10 can pose similar or different security risks as the first and second office machines 6 and 8. Moreover, in some examples, the third office machine 10 may not employ a mechanism (e.g., a security protocol) for controlling the security settings of the third office machine 10. In such a situation, the computer 20 can execute a security client 21 that can communicate with the security computer 11 to administer security settings related to the third office machine 10 in a manner described herein.

The security computer 11 can be implemented, for example, as a desktop computer, a laptop computer, a server, a tablet computer or the like. The security computer 11 can include a non-transitory memory 22 for storing machine-readable instructions. The memory 22 could be implemented, for example as volatile memory (e.g., RAM), nonvolatile memory (e.g., a hard disk, flash memory, a solid state drive or the like) or a combination of both. The security computer 11 can also include a processing unit 24 (e.g., a processor core) for accessing the memory 22 and executing the machine-readable instructions. The memory 22 of the security computer 11 can include a security control 26 the can administer an office machine security policy to the first office machine 6, the second office machine 8 and the third office machine 10.

The security control 26 can include a device layer 28 to communicate with each of the office machines in the heterogeneous fleet of office machines over the network 4, including the first office machine 6, the second office machine 8 and the third office machine 10. In some examples, the device layer 28 can conduct a network search of the network 4 to identify a network address (e.g., an IP address) of the first office machine 6, the second office machine 8 and/or the computer 20 coupled to the third office machine 10. Moreover, the security control 26 can query the identified office machines and/or the computer 20 to receive identification data for each of the first office machine 6, the second office machine 8 and the third office machine 10. Additionally or alternatively, the security client 18 of the first office machine 6 can identify the security control 26 executing on the security computer 11 and provide identification data to the security control 26 that identifies characteristics of the first office machine 6.

The identification data for a given office machine can include, for example, an identifier (e.g., a model number) of the given office machine. Additionally or alternatively, the identification data for the given office machine can include a configuration item that identifies a configurable function of the given office machine. For instance, the configuration item can include printing, web printing, scanning, faxing, user login, password input or the like. In some examples, the configuration item can be a device-specific value (e.g., a proprietary value) that varies based on a model of the given office machine. Accordingly, the device layer 28 can employ a translation pipeline to translate the configuration item of the identification data for the given office machine into a translated configuration item that can be implemented as a normalized value that can be standardized relative to each of the first office machine 6, the second office machine 8 and the third office machine 10. The normalized value can be implemented, for example, as a common nomenclature for the heterogeneous fleet of office machines and is understandable by components of the security control 26.

In some examples, some portion of the identification data for a given office machine can be derived by the device layer 28. For instance, in some examples, the device layer 28 can receive the identifier from the given office machine, but not receive the configuration item of the configuration data. In such a situation, the device layer 28 can indirectly provide a request to a database layer 30 of the security control 26 for the configuration item of the given office machine. The database layer 30 can interact with a database 31. For instance, the device layer 28 can provide the request to a service layer 32 of the security control, which service layer 32 can relay the request to the database layer 30.

In some examples, the database layer 30 can communicate with the database 31 over the network 4. In other examples, the database 31 can be stored locally on the security computer 11. The database 31 could be implemented, for example, as a relational database, such as an SQL database; although other types of databases could be used.

In response to receipt of the request for the configuration item for the office machine, the database layer 30 can query the database 31 for office machine information based on the identifier of identification data for the given office machine. The database layer 30 can relay the office machine information retrieved from the database 13 for the given office machine to the service layer 32. In response, the service layer 32 can relay the office machine information to the device layer 28, such that the device layer 28 can derive the configuration item for the given office machine.

The identification data for each identified office machine can be provided from the device layer 28 to the service layer 32 of the security control 26. The service layer 32 can generate an office machine record for each identified office machine that includes the identification data with the translated configuration item. The service layer 32 can provide each identified office machine record to the database layer 30 of the service control. In response, the database layer 30 can write the office machine record for each identified office machine to the database 31.

The security control 26 can include a user interface 34 (e.g., a graphical user interface) that can receive user input and provide user output. In one example, the user interface 34 can provide a mechanism to facilitate the generation of and/or modification of the office machine security policy for the heterogeneous fleet of office machines, including the first office machine 6, the second office machine 8, and the third office machine 10. The office machine security policy can include a list of security settings for each office machine in the heterogeneous fleet of office machines. The service layer 32 can receive data characterizing the user input provided to the user interface 34. In some examples, a single office machine security policy can be applied to each of the office machines in the system 2 (e.g., the entire heterogeneous fleet of office machines). In other examples, multiple security policies can be created for groups of office machines in the system 2 (e.g., a subset of the heterogeneous fleet of office machines).

The security settings can include, for example, settings related to user authentication. For instance, one security setting can be related to walk-up authentication. In such a situation, if walk-up authentication is enabled, in the event a print job is sent to a given office machine in the heterogeneous fleet of office machines, the given office machine can require a user to enter a username and/or a password at the given office machine before the print job will be executed (e.g., printing of a document). The security setting can also include a policy value that includes data associated with the security setting. The security setting can also include a severity value characterizing a severity of the security risk associated with the security setting. The security setting can further include an unsupported value that identifies an action to be taken by the given office machine in the event that the given office machine does not support the associated security setting. For instance, in the above example related to the security setting of walk-up authentication, the given office machine may not have a keypad to enter the username and password (e.g., the second office machine 8). In such a situation, the unsupported value can be set to "IGNORE," which can indicate that walk up authentication will not be required for office machines that do not support walk-up authentication. In other examples, the unsupported value can be set to "DISABLE," which can indicate that print jobs cannot be executed by the given office machine, so as to avoid a security breach.

Other security settings can be related to, for example, printing services, server authentication, password management, device configuration, web services, device control, file system access protocols, e-mail and/or fax services or the like. Upon setting the security settings for the office machine security policy for the office machines in the heterogeneous fleet of office machines, the service layer 32 can generate an office machine security policy record characterizing the office machine security policy.

The office machine security policy record can be provided to the database layer 30. In response, the database layer 30 can store the office machine security policy in the database 31. Additionally, the service layer 32 can request the office machine records from the database layer 30. In response to such request, the database layer 30 can access the database 31 to obtain the office machine records for each office machine in the heterogeneous fleet of office machines, including the first office machine 6, the second office machine 8 and the third office machine 10 on the network 4.

The service layer 32 can apply the office machine security policy to each office machine in the heterogeneous fleet of office machines (or some subset thereof), including the first office machine 6, the second office machine 8 and the third office machine 10. To apply the office machine security policy to each office machine in the heterogeneous fleet of office machines, the service layer 32 can examine each security setting of the office machine security policy with the configuration item of a given office machine. The service layer 32 can generate a security configuration for each office machine in the heterogeneous fleet of office machines. Additionally, in some examples, the user interface 34 can be employed by the user to modify security settings in the security configuration for each office machine. In this manner, the security settings for each office machine can be manually overridden based on preferences of the user. The security configuration for each office machine can be provided to the database layer 30 and the device layer 28. The database layer 30 can store a security configuration in the office machine record for each office machine in the heterogeneous fleet of office machines in the database 31.

The device layer 28 can employ the translation pipeline to translate the security configuration for each office machine in the heterogeneous fleet of office machines into instructions native to each respective office machine, which translated instructions can be referred to as security instructions. For instance, in some examples, the device layer 28 can translate the security configuration for the first and second office machines 6 and 8 into SNMP instructions. Additionally, in some examples, the device layer 28 can translate the security configuration for the third office machine 10 into security instructions for a protocol understandable by the computer 20 (e.g., SNMP and/or the Web Services Protocol).

To implement the office machine security policy at each office machine in the heterogeneous fleet of office machines, the security instructions can be provided to each office machine in the heterogeneous fleet of office machines. One office machine can include the security client 18, such as the first office machine 6. In such an example, the office machine security policy can be pulled from the security computer 11 by the first office machine 6. For instance, the office machine security policy can be pulled by the security client 18 of the first office machine 6 at a power-up of the first office machine 6, which can be referred to as Instant-On security. To pull the office machine security policy, the security client 18 that can request the security instructions from the security computer 11 for the first office machine 6. In response to the request, the device layer 28 can provide the security instructions to the security client 18 via the network 4. Upon receipt of the security instructions, the security instructions can be executed by the processing unit 14 of the first office machine 6 to implement the office machine security policy. Moreover, the security client 18 can periodically (e.g., hourly, daily or weekly) re-pull the office machine security policy in the manner described so that changes to the office machine security policy can be reflected at the first office machine 6. Other office machines that contain a security client can pull the office machine security policy in a similar manner.

Another office machine, such as the second office machine 8, may not have the security client installed thereon. In such a situation, the security control 26 can push the office machine security policy to the second office machine 8. To push the office machine security policy, the device layer 28 can provide the security instructions to the second office machine 8 via the network 4. Additionally, the device layer 28 can provide the second office machine 8 with an instruction commanding the second office machine 8 to execute the security instructions, which instruction can be referred to as an execute instruction. In response to the security instructions and the execute instruction, the second office machine 8 can execute the security instructions to implement the office machine security policy. Additionally, the security control 26 can push updated the security instructions to the second office machine 8 so that changes to the office machine security policy can be reflected at the second office machine 8. The updates can be sent periodically or responsive to security policy changes.

Furthermore, still another office machine, such as the third office machine 10 can be tethered to the computer 20, and may not include the security client executing on the third office machine 10. However, the computer 20 can include the security client 21 that can operate in a manner similar to the security client 18 executing on the first office machine 6. For instance, the security client 21 of the computer 20 can pull the office machine security policy from the security control 26. To pull the office machine security policy, the security client 21 of the computer 20 can request the security instructions from the device layer 28 of the security control 26. In response, the device layer 28 can provide the security instructions via the network 4 to the security client 21 of the computer 20. The security client 21 of the computer 20 can execute the security instructions to implement the office machine security policy on the third office machine 10.

It is noted that in some examples, the computer 20 can provide an interface (e.g., a graphical user interface) for implementing the office machine security policy. For instance, in the event that the office machine security policy enables walk-up authentication, the computer 20 may prompt the user for a user name and/or password in response to receiving a print job for the office machine. In such a situation, upon authenticating such a user, the computer 20 can provide the third office machine 10 with the print job, such that the print job can be executed by the office machine.

By employment of the system 2, security holes existing due to office machine capabilities can be reduced and/or eliminated. Additionally, the employment of the office machine security policy obviates the need for individual configuration of security configuration at each office machine in the heterogeneous fleet of office machines such that a rapid deployment of the office machine security policy can be achieved on the heterogeneous fleet of office machines.

Figure 2:
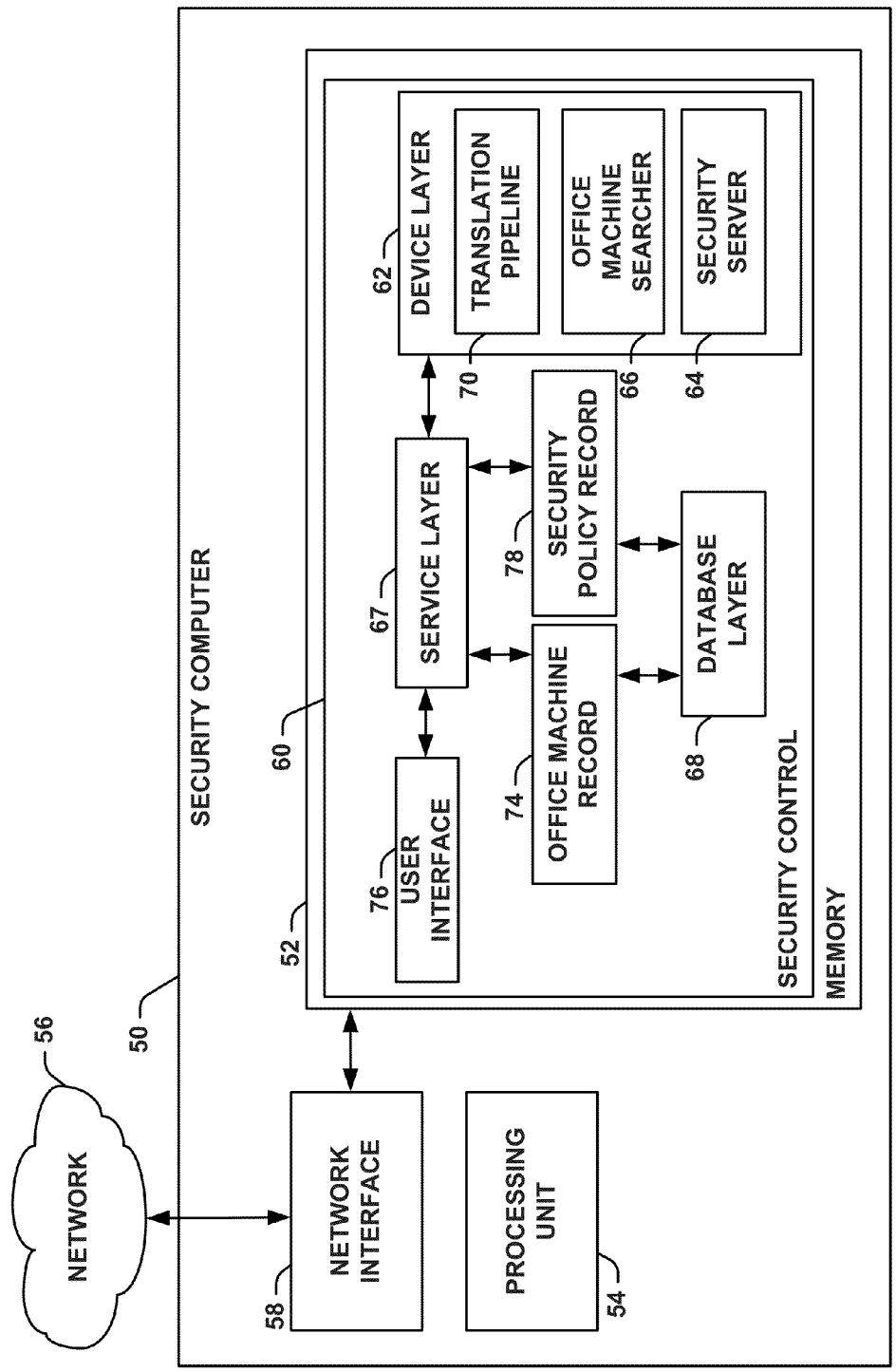
FIG. 2 illustrates an example of a security computer.
Figure 3:
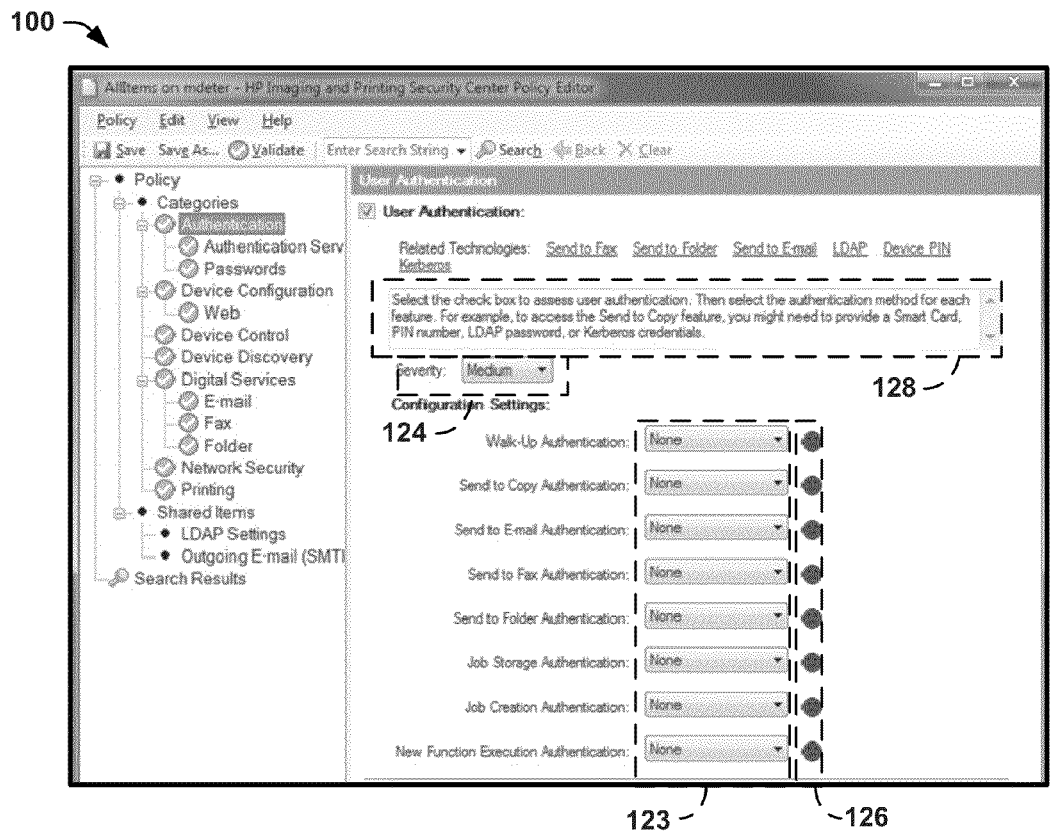
FIGS. 3-14 illustrate example screen shots of a user interface to generate an office machine security policy.
Figure 4:
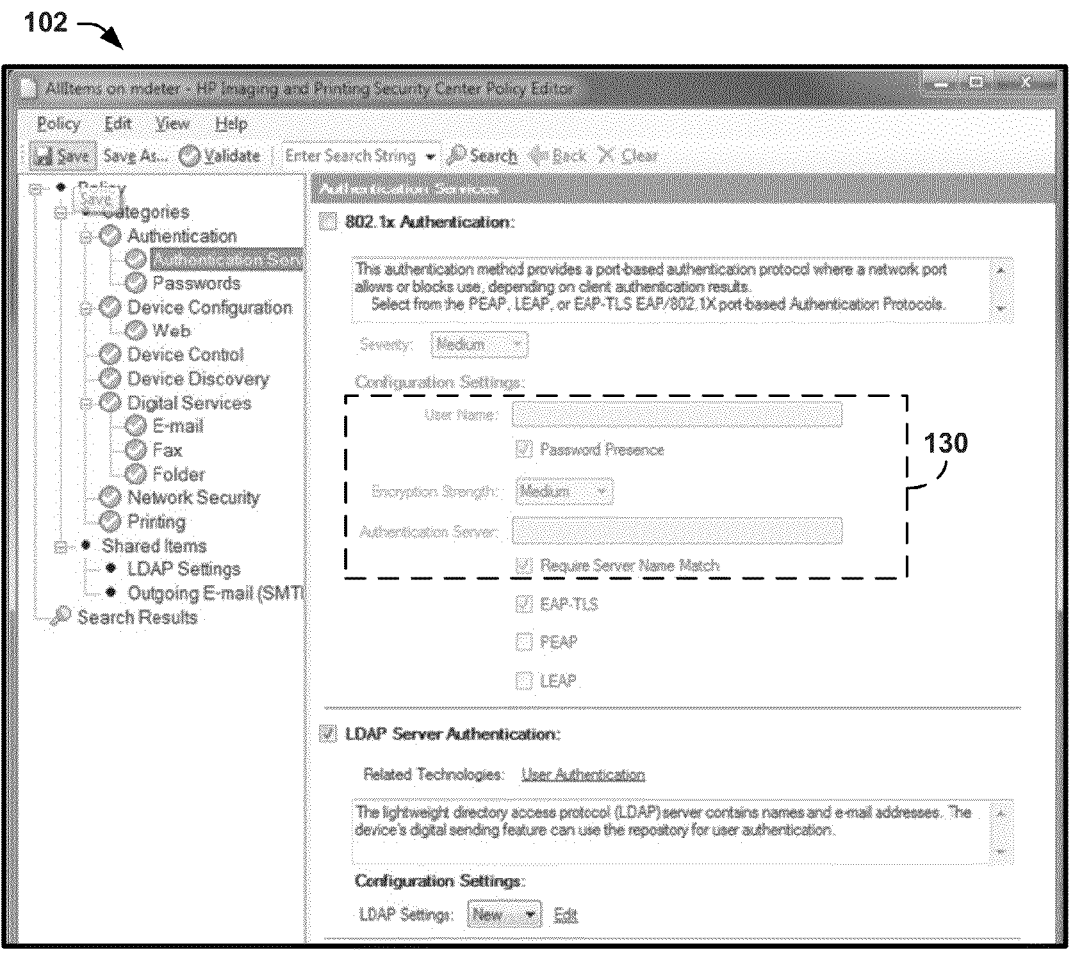
Figure 5:
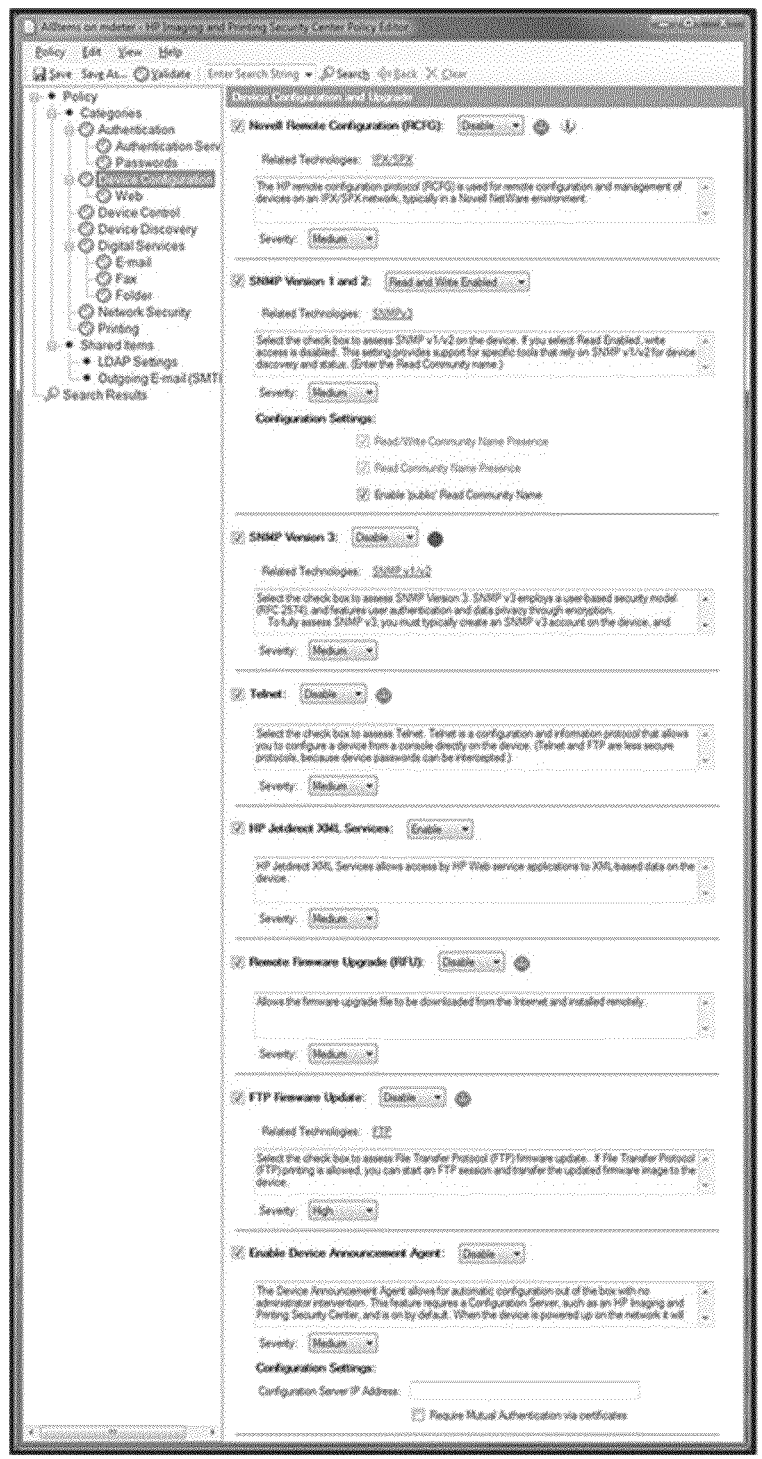
Figure 6:
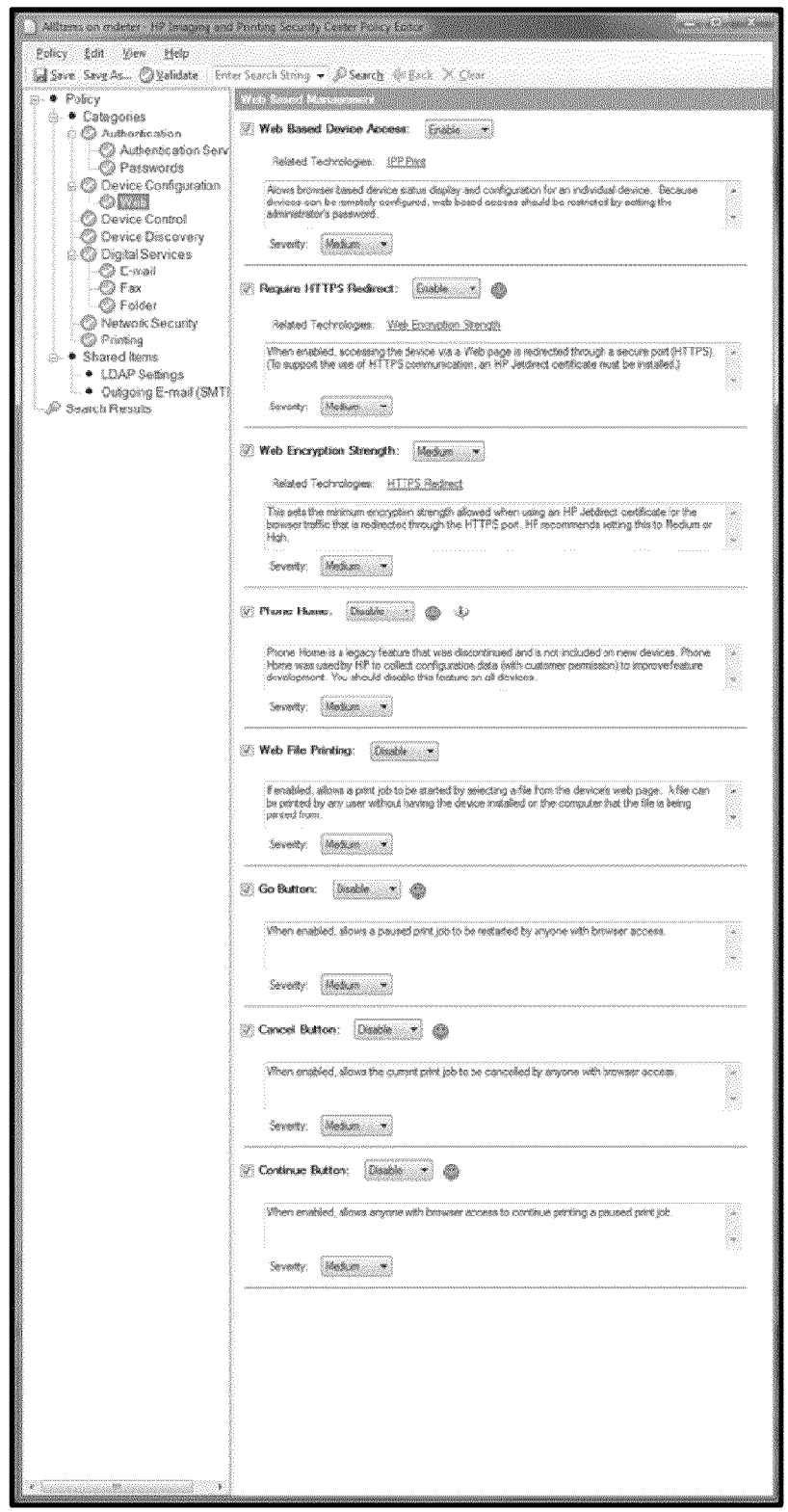
Figure 7:
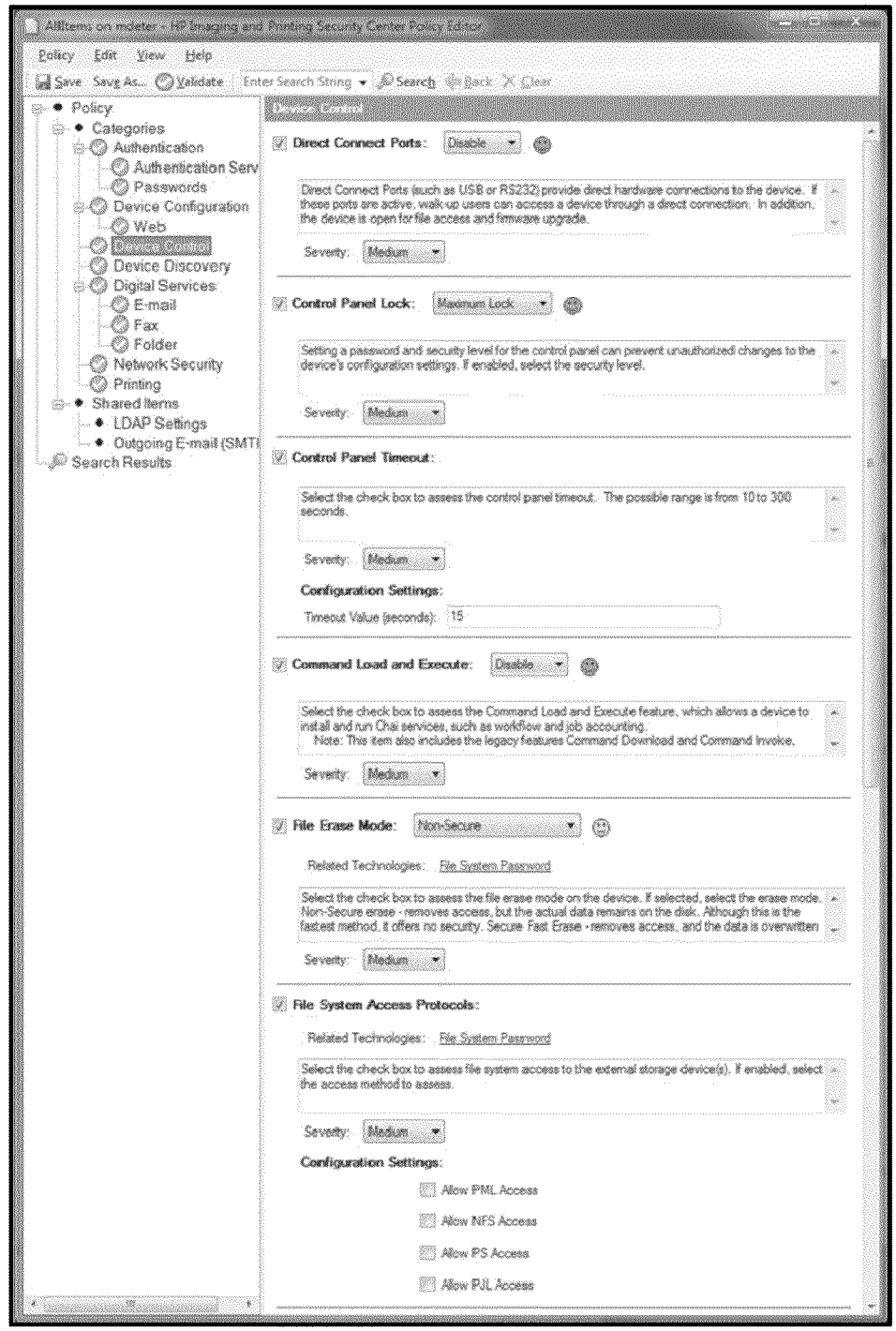
Figure 8:
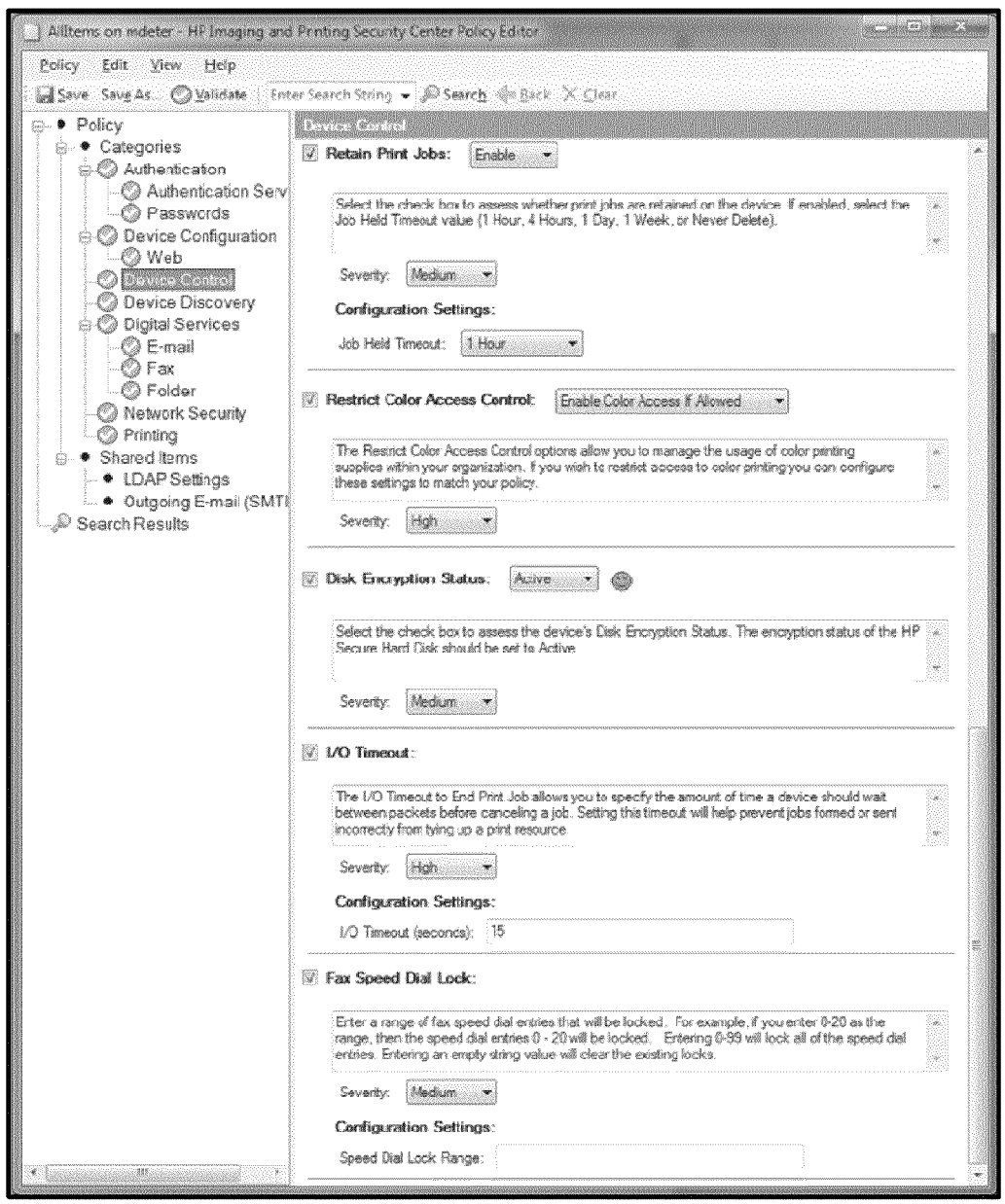
Figure 9:
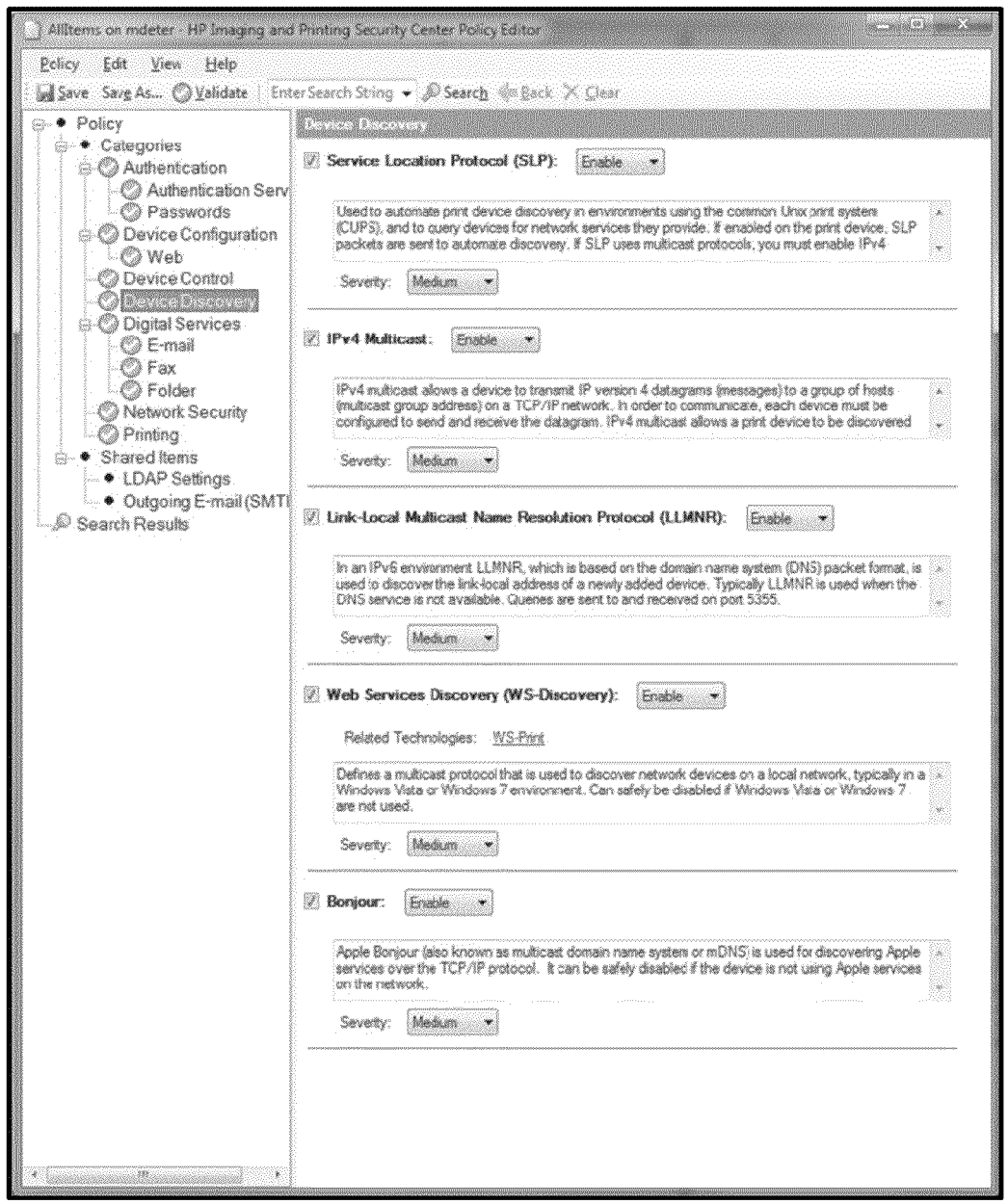
Figure 10:
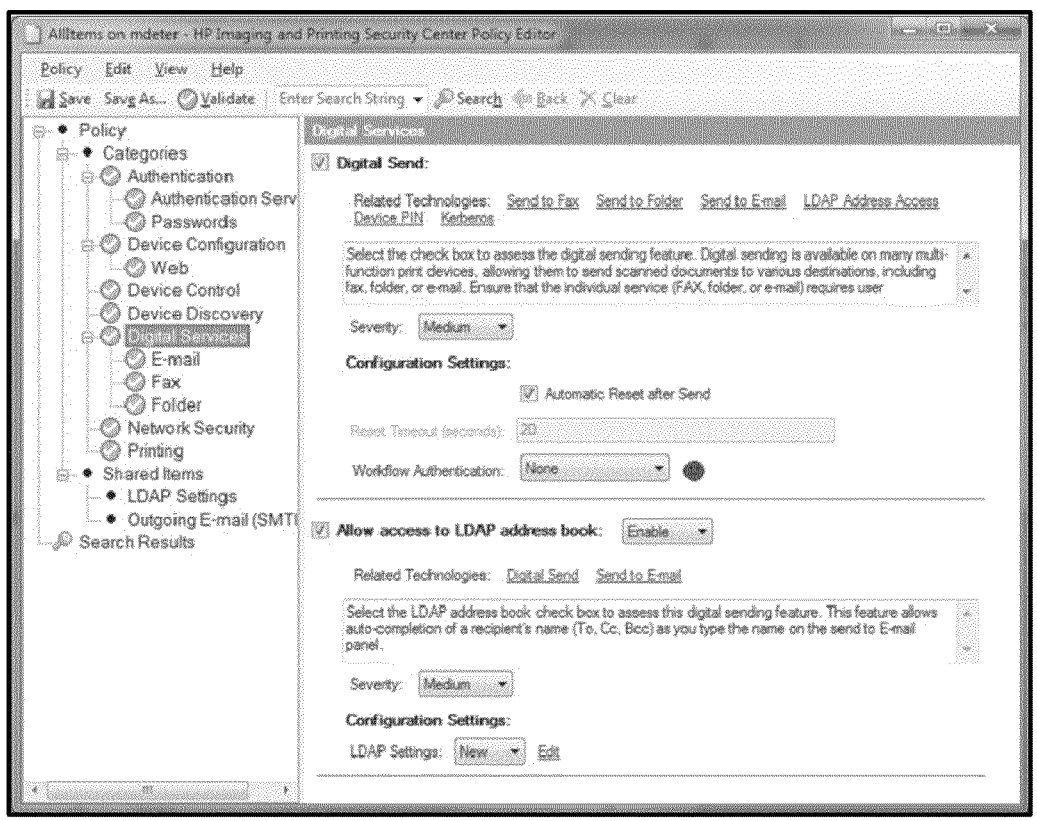
Figure 11:
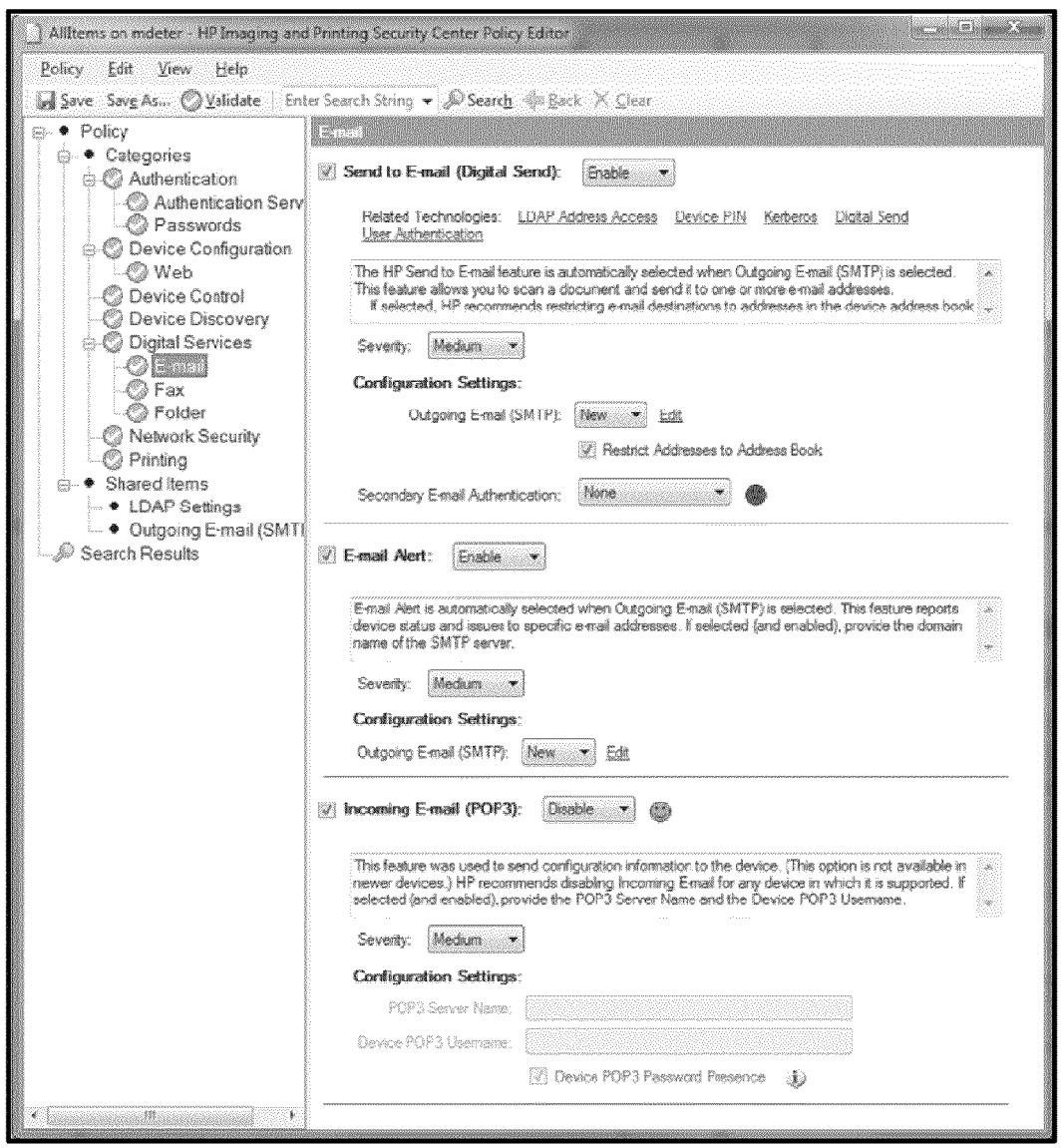
Figure 12:
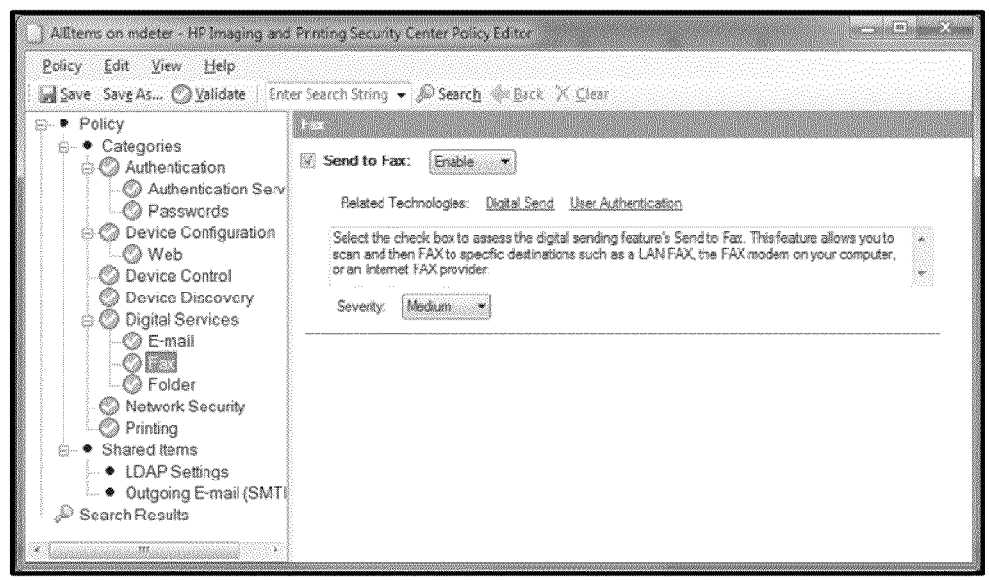
Figure 13:
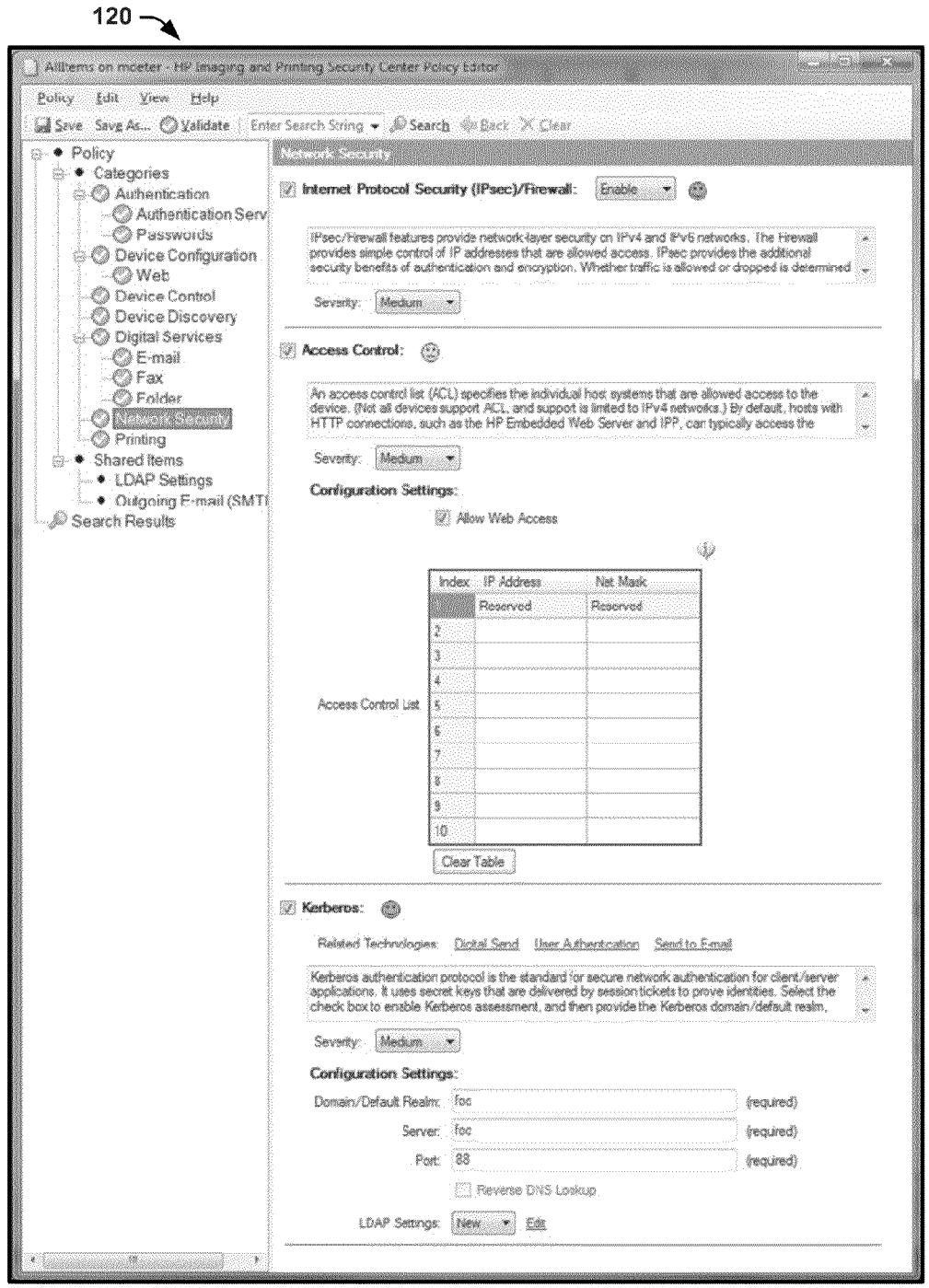
Figure 14:
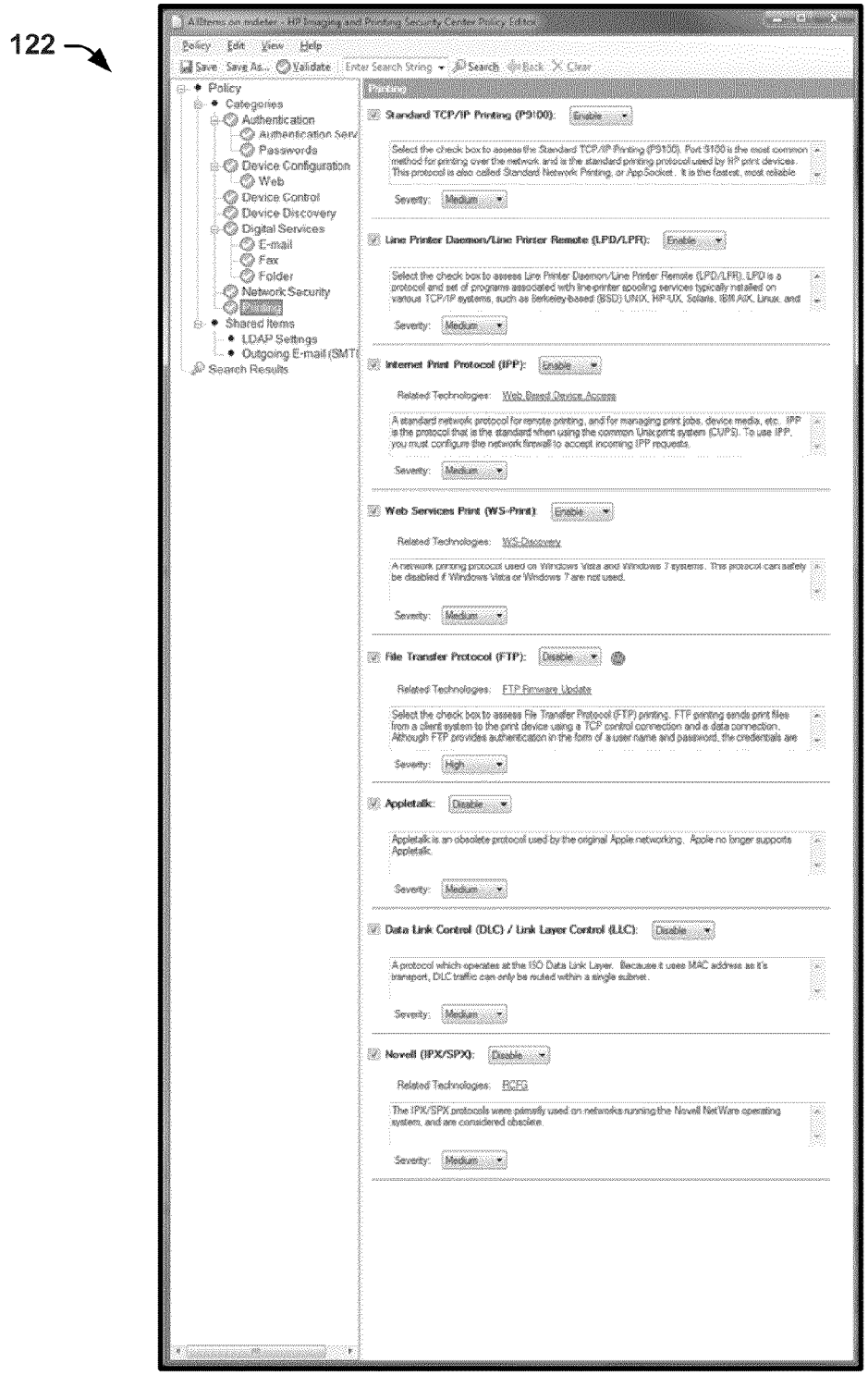

FIG. 2 illustrates an example of a security computer 50 that could be employed, for example, to implement the security computer 11 illustrated in FIG. 1. The security computer 50 can include, for example, a memory 52 for storing machine readable instructions. The memory 52 can be a non-transitory computer readable medium. The memory 52 could be implemented, for example, as volatile memory (e.g., random access memory), nonvolatile memory (e.g., flash memory, a hard disk drive, a solid-state drive or the like) or a combination thereof. The security computer 50 can also include a processing unit 54 to access the memory 52 and execute the machine readable instructions. The processing unit 54 could be implemented, for example, as a processor core. The security computer 50 can communicate with other nodes via a network 56. The network 56 could be implemented, for example, as a public network (e.g., the Internet) a private network (e.g., a local area network, a cellular data network or the like) or a combination thereof. The network 56 can employ, for example, TCP/IP, IPv6 or the like. The security computer 50 can communicate with the network 56 through a network interface 58 that could be implemented, for example, as a network interface card.

The memory 52 can include a security control 60 for administering an office machine security policy to office machines in a heterogeneous fleet of office machines via the network 56. The security control 60 can include a device layer 62 that can communicate with office machines by the network 56.

The device layer 62 can identify office machines in the heterogeneous fleet of office machines on the network 56. In some examples, each office machine can be in a group of office machines (e.g., a subset of the heterogeneous fleet of office machines). In other examples, each office machine can be in the same group (e.g., the entire heterogeneous fleet of office machines). The device layer 62 can include a security server 64 that can register the security computer 50 with a domain name system (DNS). The security control 60 can be recognized by a security client executing on an office machine (e.g., security client 18 of the first office machine 6 illustrated in FIG. 1) through the registration with the DNS. In such a situation, the security client can generate an announcement of the associated office machine to the security control 60. In some examples, the security control 60 can be executing on a computer tethered to an office machine (e.g., the computer 20 illustrated in FIG. 1). Additionally, the security client can provide the security server 64 with identification data that identifies an identifier (e.g., a model number) and a configuration item for the associated office machine. Additionally or alternatively, the device layer 62 can include an office machine searcher 66 that can search addresses (e.g., IP addresses) of the network 56 to discover office machines coupled to the network 56. Upon discovering an office machine, the security server 64 can query the discovered office machine for identification data.

In some examples, a subset of office machines in the heterogeneous fleet of office machines may not provide some portion of the identification data (e.g., the configuration item). In such a situation, the device layer 62 can assign and provide an identifier for each office machine in the subset of office machines in the heterogeneous fleet of office machines to a service layer 67 of the security control 60. In response, the service layer 67 can provide the identifier for each office machine to a database layer 68. The database layer 68 can interface with a database via the network 56. In some examples, the database can be stored locally on the security server 64. In response to the identifiers for the subset of office machines in the heterogeneous fleet of office machines, the database layer 68 can query the database for office machine information based on the identifier of each office machine in the subset of office machines in the heterogeneous fleet of office machines. The database layer 68 can relay the office machine information for each office machine in the subset of office machines in the heterogeneous fleet of office machines to the service layer 67. In response, the service layer 67 can relay the office machine information for each office machine in the subset of office machines in the heterogeneous fleet of office machines to the device layer 62, such that the device layer 62 can derive the configuration item for the subset of office machines in the heterogeneous fleet of office machines.

The device layer 62 of the security control 60 can include a translation pipeline 70 that can translate the configuration item of the identification data for a given office machine into a translated configuration item that can be implemented as a normalized value that can be standardized relative to each of identified office machine in the heterogeneous fleet of office machines. The device layer 62 can provide the identification data with the translated configuration item for each identified office machine to the service layer 67 of the security control 60.

The service layer 67 of the security control 60 can generate an office machine record 74 for each identified office machine in the heterogeneous fleet of office machines. The office machine record 74 can include the identification data and the translated configuration item. The service layer 67 can provide the office machine record 74 to the database layer 68 of the security control 60. In response, the database layer 68 can store the office machine record 74 for each identified office machine in the database.

The security control 60 can include a user interface 76 (e.g., a graphical user interface) that can receive user input and provide user output in a user perceptible format. In one example, the user interface 76 can provide a mechanism to facilitate generating and/or modifying the office machine security policy for office machines in the heterogeneous fleet of office machines. In some examples, the office machine security policy can be associated with a group of office machines on the network 56, such that there can be multiple security policies to accommodate different groups of office machines. Additionally, in other examples, the same office machine security policy can be implemented for each identified office machine in the heterogeneous fleet of office machines. As disclosed herein, even in situations where the same office machine security policy is implemented for a fleet of office machines, a given security setting may be modified, such that the given setting can be ignored or disabled, depending on the capabilities of each respective machine.

The office machine security policy can include a list of security settings that can be configured for the office machines in the heterogeneous fleet of office machines or the office machines within a given group of office machines in the heterogeneous fleet of office machines. The service layer 67 can receive data characterizing the user input provided to the user interface 76.

A given security setting can include a policy value that includes data associated with the given security setting. The given security setting can also include a severity value characterizing a severity of the security risk associated with the security setting. The given security setting can further include an unsupported value that identifies an action to be taken by a given office machine in the event that the given office machine does not support the given security setting. In such a situation, the unsupported value can be set to "IGNORE," which can indicate that a security procedure will not be required for office machines that do not support the given security setting. In another example, the situation the unsupported value can be set to "DISABLE," which can indicate that certain jobs cannot be executed by the given office machine, so as to avoid a security leak.

FIGS. 3-14 illustrate examples of screen shots 100, 102, 104, 106, 108, 110, 112, 114, 116, 118, 120 and 122 of the user interface 76. For instance, the screenshot 100 in FIG. 3 includes pull down menus 123 for selecting security settings related to user authentication. Additionally, the screenshot 100 illustrated in FIG. 3 of the user interface 76 includes a pull-down menu 124 to set a security severity setting associated with user authentication. Still further, the screenshot 100 illustrated in FIG. 3 includes an icons 126 that can be clicked to change an action taken in the event that a given office machine does not support an associated security setting. The screenshot 100 of FIG. 3 of the user interface 76 includes text 128 describing security settings related to user authentication. In some examples, text can be input to set a security setting. For instance, the screenshot 102 illustrated in FIG. 4 includes text boxes 130 for inputting a username and an authentication server.

Referring back to FIG. 2, the user interface 76 can interact with the service layer 67 to facilitate the generation and/or modification of the office machine security policy. TABLE 1 includes an example of an office machine security policy. In TABLE 1, related security settings are grouped together and a heading for each group is included. Additionally, a symbol "☐" for a given line in the table can indicate that the given line represents a configurable security setting, while a symbol "★" can indicate for a given line that the given line has a text field that can be employed by a configurable security setting. Moreover, each configurable security setting can include a policy value (labeled in TABLE 1 as "Policy Value") that can be set to "None" if a given configurable security setting is disabled or "Enable" if the given security setting is enabled. Alternatively, the policy value of the configurable security setting can be set to data that can be employed to implement the given configurable security setting, such as a name of a server. Moreover, each configurable security setting can include a severity value, which can be labeled in TABLE 1 as "Severity" and can indicate the security risk posed by disabling the associated security setting.

Additionally, each configurable security setting can include a remediation value (labeled in TABLE 1 as "Remediation") that can indicate that whether a given configurable security setting can be repaired in the event of failure. Still further, each configurable security setting can include an unsupported value (labeled in TABLE 1 as "Unsupported") that can indicate an action to be taken by a given office machine in the event that the given office machine does not support a given configurable security setting. In one example, an unsupported value of "Ignore" can cause the given office machine to operate without the given security setting, while an unsupported value of "disable" can cause the given office machine to refuse to execute a job if the given configurable security setting is not supported by the given office machine.

TABLE 1

SECURITY POLICY

| Policy Item | Policy Value | Severity | Remediation | Unsupported |
|---|---|---|---|---|
| Authentication: User Authentication | | | | |
| Walk-Up Authentication | None | Medium Risk | Enable | Ignore |
| Send to Copy Authentication | None | Medium Risk | Enable | Ignore |
| Sent to E-mail Authentication | None | Medium Risk | Enable | Ignore |
| Send to Fax Authentication | None | Medium Risk | Enable | Ignore |
| Send to Folder Authentication | None | Medium Risk | Enable | Ignore |
| Job Storage Authentication | None | Medium Risk | Enable | Ignore |
| Job Creation Authentication | None | Medium Risk | Enable | Ignore |
| New Function Execution Authentication | None | Medium Risk | Enable | Ignore |
| Authentication Services: 802.1x Authentication | | | | |
| ★ User Name | | | | |
| ★ Password | | | | |
| ★ Encryption Strength | | | | |
| ★ Authentication Seriver | | | | |
| ★ Require Server Name Match | | | | |
| ★ EAP-TLS | | | | |
| ★ PEAP | | | | |
| ★ LEAP | | | | |
| Server Name | foo | Medium Risk | Enable | Ignore |
| Server Port | 389 | Medium Risk | Enable | Ignore |
| Server Login | Simple with SSL | Medium Risk | Enable | Ignore |
| Use Device User's Credential | Enable | Medium Risk | Enable | Ignore |
| Server Bind Prefix | fooBindPrefix | Medium Risk | Enable | Ignore |
| ★ LDAP Administrator Domain Name | | | | |
| ★ LDAP Administrator Password | | | | |
| ★ LDAP Public Username | | | | |
| ★ LDAP Public Password | | | | |
| Server Bind Root | foo | Medium Risk | Enable | Ignore |
| Server Search Root | foo | Medium Risk | Enable | Ignore |

TABLE 1-continued

SECURITY POLICY

| Policy Item | Policy Value | Severity | Remediation | Unsupported |
|---|---|---|---|---|
| User Name Match Attribute | foo | Medium Risk | Enable | Ignore |
| Retrive E-mail Attribute | foo | Medium Risk | Enable | Ignore |
| Retrieve Name Attribute | foo | Medium Risk | Enable | Ignore |
| PEAP | | | | |
| LEAP | | | | |
| Passwords: Unified Administrator Password | | | | |
| Unified Administrator Password | Set | Medium Risk | Disable | Ignore |
| Passwords: Bootloader Password | | | | |
| Bootloader Password | Set | Medium Risk | Disable | Ignore |
| Passwords: File System Password | | | | |
| File System Password | Set | Medium Risk | Disable | Ignore |
| Passwords: PJL Password | | | | |
| PJL Password | Enable | Medium Risk | Disable | Ignore |
| Passwords: Device PIN | | | | |
| Group One PIN | Set | Medium Risk | Disable | Ignore |
| Group Two PIN | Set | Medium Risk | Disable | Ignore |
| Passwords: Fax PIN | | | | |
| Fax Pin | Set | Medium Risk | Disable | Ignore |
| Device Configuration | | | | |
| Enable Device Announcement Agent | Disable | Medium Risk | Enable | Ignore |
| Configuration Server IP Address | | Medium Risk | Enable | Ignore |
| Require Mutual Authentication via certificates | Disable | Medium Risk | Enable | Ignore |
| FTP Firmware Update | Disable | High Risk | Enable | Ignore |
| HP Jetdirect XML Serives | Disable | Medium Risk | Enable | Ignore |
| Novell Remote Configuration (RCFG) | Disable | Medium Risk | Enable | Ignore |
| Remote Firmware Upgrade (RFU) | Disable | Medium Risk | Enable | Ignore |
| SNMP Version 1 and 2 | Read and Write Enabled | Medium Risk | Disable | Ignore |
| Read/Write Community Name | Set | Medium Risk | Disable | Ignore |
| Read Community Name | Set | Medium Risk | Disable | Ignore |
| Enable 'public' Read Community Name | Enable | Medium Risk | Disable | Ignore |
| SNMP Version 3 | Disable | Medium Risk | Disable | Ignore |
| Telnet | Disable | Medium Risk | Enable | Ignore |
| Web | | | | |
| Web Based Device Access | Enable | Medium Risk | Disable | Ignore |
| Require HTTPS Redirect | Enable | Medium Risk | Enable | Ignore |
| Web Encryption Strength | Medium | Medium Risk | Enable | Ignore |
| Phone Home | | Medium Risk | Enable | Ignore |
| Web File Printing | Disable | Medium Risk | Enable | Ignore |
| Go Button | Disable | Medium Risk | Enable | Ignore |
| Cancel Button | Disable | Medium Risk | Enable | Ignore |
| Continue Button | Disable | Medium Risk | Enable | Ignore |
| Device Control | | | | |
| Direct Connect Ports | Disable | Medium Risk | Enable | Ignore |
| Control Panel Lock | Maximum Lock | Medium Risk | Enable | Ignore |
| Control Panel Timeout | | | | |
| Timeout Value (seconds) | 15 | Medium Risk | Enable | Ignore |
| Command Load and Execute | Disable | Medium Risk | Enable | Ignore |
| File Erase Mode | Non-Secure | Medium Risk | Enable | Ignore |
| File System Access Protocols | | | | |
| Allow PML Access | Disable | Medium Risk | Enable | Ignore |
| Allow NFS Access | Disable | Medium Risk | Enable | Ignore |
| Allow PS Access | Disable | Medium Risk | Enable | Ignore |
| Allow PJL Access | Disable | Medium Risk | Enable | Ignore |
| Retain Print Jobs | E | Medium Risk | Enable | Ignore |
| Job Held Timeout | Hour | Medium Risk | Enable | Ignore |
| Retrict Color Access Control | Enable Color Access if Allowed | High Risk | Enable | Ignore |
| Disk Encryption Status | Active | Medium Risk | Disable | Ignore |
| I/O Timeout | | | | |
| I/O Timeout (seconds) | 15 | High Risk | Enable | Ignore |
| Fax Speed Dial Lock | | | | |
| Speed Dial Lock Range | | Medium Risk | Enable | Ignore |

TABLE 1-continued

SECURITY POLICY

| Policy Item | Policy Value | Severity | Remediation | Unsupported |
|---|---|---|---|---|
| Device Discovery | | | | |
| Service Location Protocol (SLP) | Enable | Medium Risk | Enable | Ignore |
| IPv4 Multicast | Enable | Medium Risk | Enable | Ignore |
| Link-Local Multicast Name Resolution Protocol (LLMNR) | Enable | Medium Risk | Disable | Ignore |
| Web Services Discovery (WS-Discovery) | Enable | Medium Risk | Enable | Ignore |
| Bonjour | Enable | Medium Risk | Enable | Ignore |
| Digital Services: Digital Send | | | | |
| Automatic Reset after Send | Enable | Medium Risk | Enable | Ignore |
| ★ Reset Timeout (seconds) | | | | |
| Workflow Authentication | None | Medium Risk | Enable | Ignore |
| Allow access to LDAP address book | Enable | Medium Risk | Enable | Ignore |
| Server Name | foo | Medium Risk | Enable | Ignore |
| Server Port | 389 | Medium Risk | Enable | Ignore |
| Server Login | Simple with SSL | Medium Risk | Enable | Ignore |
| Use Device User's Credential | Enable | Medium Risk | Enable | Ignore |
| Server Bind Prefix | fooBindPrefix | Medium Risk | Enable | Ignore |
| ★ LDAP Administrator Domain Name | | | | |
| ★ LDAP Administrator Password | | | | |
| ★ LDAP Public Username | | | | |
| ★ LDAP Public Password | | | | |
| Server Bind Root | foo | Medium Risk | Enable | Ignore |
| Server Search Root | foo | Medium Risk | Enable | Ignore |
| User Name Match Attribute | foo | Medium Risk | Enable | Ignore |
| Retrieve E-mail Attribute | foo | Medium Risk | Enable | Ignore |
| Retrieve Name Attribute | foo | Medium Risk | Enable | Ignore |
| Email | | | | |
| Send to E-mail (Digital Send) | Enable | Medium Risk | Enable | Ignore |
| Restrict Addresses to Address Book | Enable | Medium Risk | Enable | Ignore |
| Secondary E-mail Authentication | None | Medium Risk | Enable | Ignore |
| SMTP Gateway | foo | Medium Risk | Enable | Ignore |
| SMTP Port | 25 | Medium Risk | Enable | Ignore |
| Enable Authentication | Enable | Medium Risk | Enable | Ignore |
| Creditial Type | User | Medium Risk | Enable | Ignore |
| Public Username | foo | Medium Risk | Enable | Ignore |
| Public Password | Set | Medium Risk | Enable | Ignore |
| Maximum Attachment Size | 1 MB | Medium Risk | Enable | Ignore |
| Return E-mail Address | my email@example.com | Medium Risk | Enable | Ignore |
| Allow Return E-mail Address Change | Enable | Medium Risk | Enable | Ignore |
| E-mail Alert | Enable | Medium Risk | Enable | Ignore |
| SMTP Gateway | foo | Medium Risk | Enable | Ignore |
| SMTP Port | 25 | Medium Risk | Enable | Ignore |
| Enable Authentication | Enable | Medium Risk | Enable | Ignore |
| Creditial Type | User | | | |
| Public Username | foo | Medium Risk | Enable | Ignore |
| Public Password | Set | Medium Risk | Enable | Ignore |
| Maximum Attachment Size | 1 MB | Medium Risk | Enable | Ignore |
| Return E-mail Address | my email@example.com | Medium Risk | Enable | Ignore |
| Allow Return E-mail Address Change | Enable | Medium Risk | Enable | Ignore |
| Incoming E-mail (POP3) | Disable | Medium Risk | Enable | Ignore |
| ★ POP3 Server Name | | | | |
| ★ Device POP3 Username | | | | |
| ★ Device POP3 Password | | | | |
| Fax | | | | |
| Send to Fax | Enable | Medium Risk | Enable | Ignore |
| Folder | | | | |
| Send to Folder | Enable | Medium Risk | Enable | Ignore |
| Network Security | | | | |
| Internet Protocol Security (Ipsec)/Firewall | Enable | Medium Risk | Disable | Ignore |
| Access Control | | | | |
| Allow Web Access | Enable | Medium Risk | Enable | Ignore |
| Access Control List | | Medium Risk | Enable | Ignore |
| Kerberos | | | | |
| Domain/Default Realm | foo | Medium Risk | Enable | Ignore |
| Server | foo | Medium Risk | Enable | Ignore |
| Port | 88 | Medium Risk | Enable | Ignore |
| ★ Reverse DNS Lookup | | | | |
| Server Name | foo | Medium Risk | Enable | Ignore |

TABLE 1-continued

SECURITY POLICY

| Policy Item | Policy Value | Severity | Remediation | Unsupported |
| --- | --- | --- | --- | --- |
| Server Port | 389 | Medium Risk | Enable | Ignore |
| Server Login | Simple with SSL | Medium Risk | Enable | Ignore |
| Use Device User's Credential | Enable | Medium Risk | Enable | Ignore |
| Server Bind Prefix | fooBindPrefix | Medium Risk | Enable | Ignore |
| ★ LDAP Administrtor Domain Name | | | | |
| ★ LDAP Administrator Password | | | | |
| ★ LDAP Public Username | | | | |
| ★ LDAP Public Password | | | | |
| Server Bind Root | foo | Medium Risk | Enable | Ignore |
| Sever Search Root | foo | Medium Risk | Enable | Ignore |
| User Name Match Attribute | foo | Medium Risk | Enable | Ignore |
| Retrieve E-mail Attribute | foo | Medium Risk | Enable | Ignore |
| Retrieve Name Attribute | foo | Medium Risk | Enable | Ignore |
| Printing | | | | |
| Standard CP/IIP Pinting (P9100) | Enable | Medium Risk | Enable | Ignore |
| Line Printer Daemon/Line Printer Remote (LPD/LPR) | Enable | Medium Risk | Enable | Ignore |
| Internet Print Protocol (IPP) | Enable | Medium Risk | Enable | Ignore |
| Web Services Print (WS-Print) | Enable | Medium Risk | Enable | Ignore |
| File Transfer Protocol (FTP) | Disable | High Risk | Enable | Ignore |
| Appletalk | Disable | Medium Risk | Enable | Ignore |
| Data Link Control (DLC)/Link Layer Control (LLC) | Disable | Medium Risk | Enable | Ignore |
| Novell (IPX/SPX) | Disable | Medium Risk | Enable | Ignore |

The service layer 67 can generate an office machine security policy record 78 that includes the office machine security policy (e.g., TABLE 1), and provide the office machine security policy record 78 to the database layer 68. In response, the database layer 68 can store the office machine security policy record 78 in the database.

The service layer 67 can request the database layer 68 for the office machine record 74 for each office machine in the heterogeneous fleet of office machines. In response, the database layer 68 can retrieve the office machine record 74 for each office machine in the heterogeneous fleet of office machines from the database and provide the office machine record 74 for each office machine in the heterogeneous fleet of office machines to the service layer 67. The service layer 67 can generate a security configuration for each office machine based on the office machine security policy and the identification data and the office machine record 74 for each office machine. To generate the security configuration for a given office machine in the heterogeneous fleet of office machines, the service layer 67 can compare the translated configurable item of the identification data for the given office machine and compare to each security setting in the office machine security policy to determine how and if a given security setting is to be implemented on the given office machine. Moreover, the service layer 67 can provide the security configuration of each office machine to the database layer 68, such that the database layer 68 can store the security configuration for each office machine in the heterogeneous fleet of office machines in the associated office machine record 74 in the database.

Additionally, the service layer 67 can provide the security configuration for each office machine to the device layer 62. The device layer 62 can employ the translation pipeline 70 to translate the security configuration for each office machine in the heterogeneous fleet of office machines into instructions native to each respective office machine, which translated instructions can be referred to as security instructions. For instance, in some examples, the device layer 62 can translate the security configuration for a given office machine into SNMP instructions. Additionally, in some examples, the device layer 62 can translate the security settings for another office machine into security instructions for a protocol understandable by a computer tethered to the another office machine (e.g., SNMP and/or the Web Services Protocol).

To implement the office machine security policy at each office machine in the heterogeneous fleet of office machines, the security instructions can be provided to each office machine in the heterogeneous fleet of office machines and/or for each office machine within a given group of office machines associated with the office machine security policy. For instance, a given office machine can include the security client. In such an example, the office machine security policy can be pulled by the security client for the given office machine. The office machine security policy can be pulled by the security client of the given office machine at a power-up of the first office machine, which can be referred to as Instant-On security. To pull the office machine security policy, the security client can request the security instructions from the security computer 50 for the given office machine. In response to the request, the security server 64 can provide the security instructions to the security client via the network 56. Upon receipt of the security instructions, the security instructions can be executed by a processing unit of the given office machine to implement the office machine security policy. Moreover, the security client can periodically (e.g., hourly, daily or weekly) re-pull the office machine security policy in the manner described so that changes to the office machine security policy can be reflected at the given office machine. Other office machines that contain a security client can pull the office machine security policy in a similar manner.

In some examples, another office machine may not have the security client installed thereon, which office machine can be referred to as a clientless office machine. In such a situation, the security control 60 can push the office machine security policy to the clientless office machine. To push the office machine security policy, the security server 64 can provide the security instructions to the clientless office machine via the network 56. Additionally, the security server 64 can provide the clientless office machine with an instruction commanding the clientless office machine to execute the security instructions, which instruction can be an execute instruction. In response to the security instructions and the execute instruction, the clientless office machine can execute the security instructions to implement the office machine security policy. Additionally, the security server 64 can push updates in the security instructions to the clientless office machine so that changes to the office machine security policy can be reflected at the clientless office machine.

Furthermore, still another office machine, can be tethered to the computer, and may not include the security client executing on the third office machine, which office machine can be referred to as a tethered office machine. However, the computer can include the security client that can operate in a manner similar to the security client executing on the given office machine. For instance, the security client of the computer can pull the office machine security policy from the security control 60. To pull the office machine security policy, the security client of the computer can request the security instructions from the device layer 62 of the security control 60. In response, the security server 64 can provide the security instructions via the network 56 to the security client of the computer. The security client of the computer can execute the security instructions to implement the office machine security policy on the tethered office machine.

Figure 15:
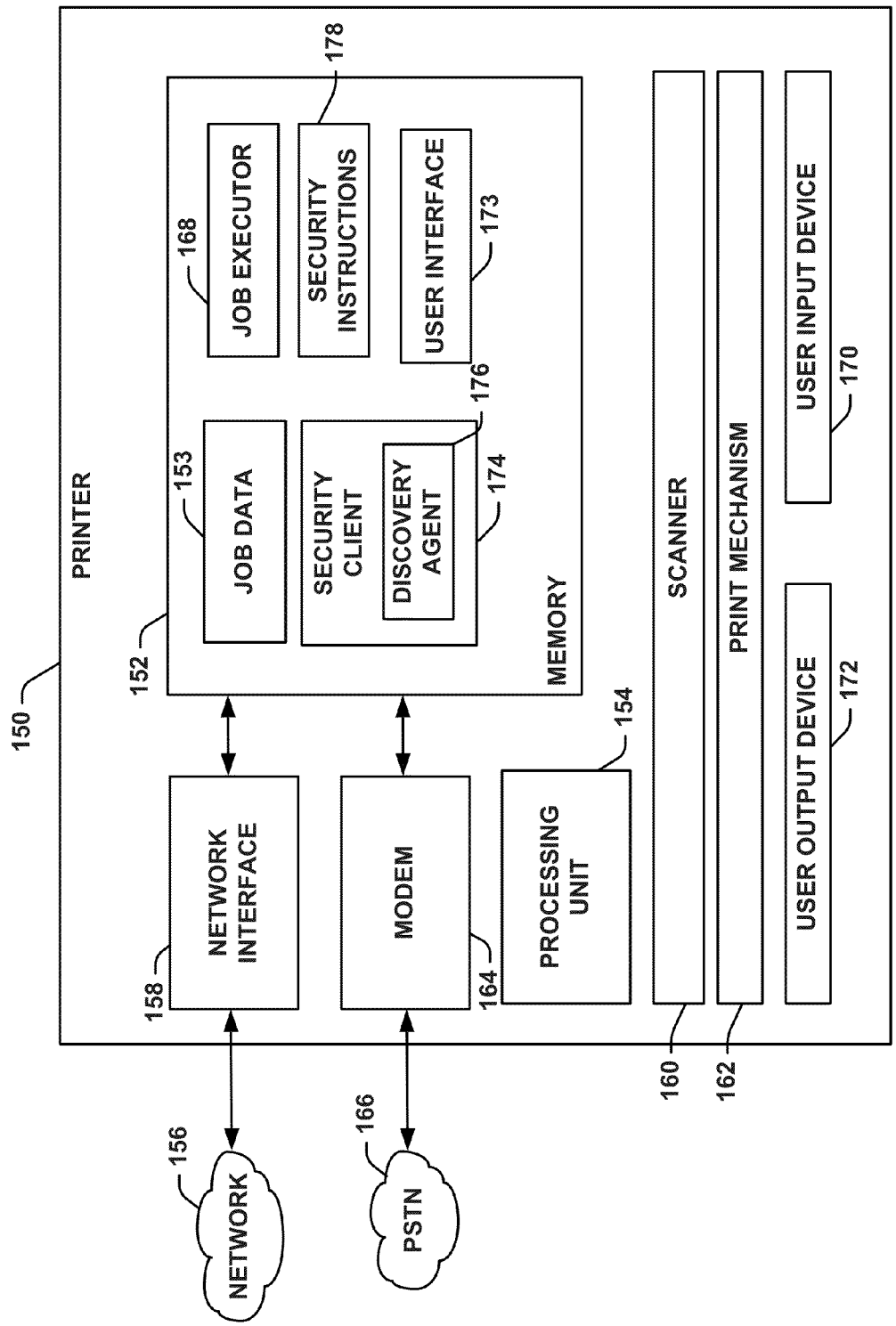
FIG. 15 illustrates an example of a printer.

FIG. 15 illustrates an example of a printer 150 that could be employed, for example, to implement the first office machine 6 illustrated in FIG. 1. The printer 150 can include, for example, a memory 152 for storing machine readable instructions. The memory 152 can be a non-transitory computer readable medium. The memory 152 could be implemented, for example, as including volatile memory (e.g., random access memory), nonvolatile memory (e.g., flash memory, a hard disk drive, a solid-state drive or the like) or a combination thereof. The printer 150 can also include a processing unit 154 to access the memory 152 and execute the machine readable instructions. The processing unit 154 could be implemented, for example, as a processor core. The printer 150 can communicate with other nodes via a network 156. The network 156 could be implemented, for example, as a public network (e.g., the Internet) a private network (e.g., a local area network, a cellular data network or the like) or a combination thereof. The network 156 can employ, for example, TCP/IP, IPv6 or the like. The printer 150 can communicate with the network 156 through a network interface 158 that could be implemented, for example, as a network interface card.

The printer 150 can include, for example, a scanner 160 for scanning documents. In some examples, data from a scanned document can be stored in the memory 152 as job data 153. Additionally, the printer 150 can include a print mechanism 162 for printing documents, such as documents in the job data 153. Furthermore, the printer 150 can include a modem 164 coupled to the public switched telephone network (PSTN) 166. In some examples, the modem 164 can fax documents in the job data 153 to another node of the PSTN 166. In one example, a job executor 168 included in the memory 152 can control operations of the printer 150 to execute a job.

The printer 150 can include a user input device 170, such as a keypad, a numeric keypad or the like. The printer 150 can also include a user output device 172, such as a display. In some examples, the user input device 170 and the user output device 172 can be integrated, for example, as a touch-screen. A user interface 173 included in the memory 152 can control the user output device 172 and the user input device 170.

A security client 174 stored in the memory 152 can employ a discovery agent 176 to query a DNS to identify and address of a security control, such as the security control 26 executing on the security computer 11 illustrated in FIG. 1 and/or the security control 60 executing on the security computer 50 illustrated on FIG. 2. Upon discovery of the security control, the security client 174 can announce the printer 150 and can provide the security control with identification data that includes a configuration item for the printer 150, such as described with respect to FIG. 1. Additionally, the security client 174 can pull an office machine security policy from the security control. To pull the office machine security policy, the security client 174 can request security instructions 178 from the security control. Upon receipt of the security instructions 178, the processing unit 154 can execute the security instructions 178 to implement the office machine security policy. It is noted that the security client 174 can be set to pull the office machine security policy at a time of power on (e.g., Instant-On) and/or periodically to accommodate changes made to the office machine security policy.

The job executor 168 can receive a job from another node of the network 156. Additionally or alternatively, the job executor 168 can generate a job based on user input, such as through the user interface 173. The job could be, for example, a print job, a scan job, a copy job a fax job, an e-mail job or the like. A document for the job can be stored in the job data 153 of the memory 152. The job executor 168 can execute the job based on the office machine security policy. Thus, security holes related to unauthorized access to the job data 153 can be reduced and/or eliminated.

Figure 16:
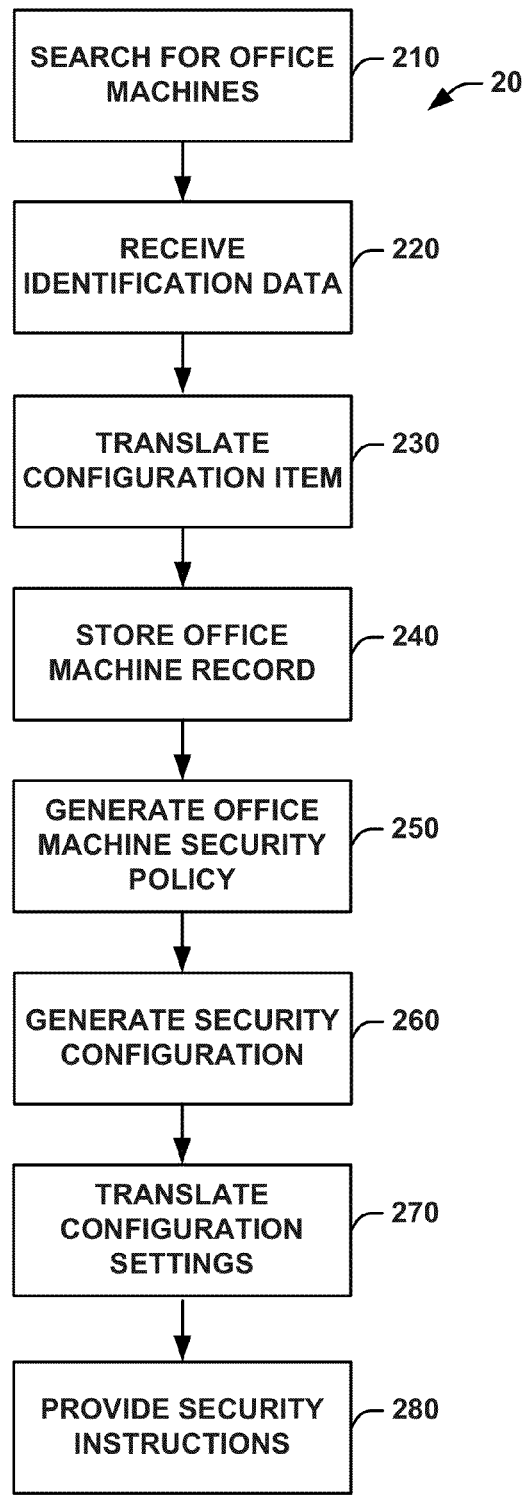
FIG. 16 illustrates an example flowchart of an example method for administering an office machine security policy.
Figure 17:
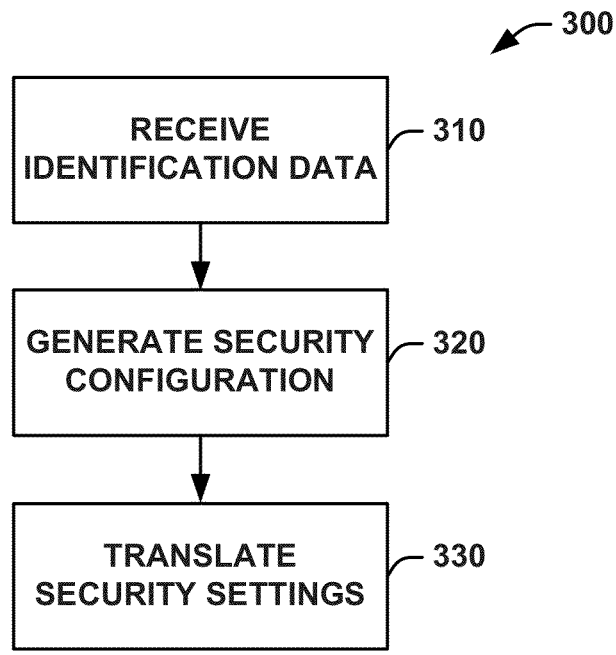
FIG. 17 illustrates an example flowchart of another example method for administering a security policy.

In view of the foregoing structural and functional features described above, example methods will be better appreciated with reference to FIGS. 16-17. While, for purposes of simplicity of explanation, the example methods of FIGS. 16-17 are shown and described as executing serially, the present examples are not limited by the illustrated order, as some actions could in other examples occur in different orders and/or concurrently from that shown and described herein. Moreover, it is not necessary that all described actions be performed to implement a method.

FIG. 16 illustrates a flow chart of an example method 200 for administering an office machine security policy. The method 200 could be executed, for example, by a security computer (e.g., the security computer 11 illustrated in FIG. 1). At 210, a device layer (e.g., the device layer 28 illustrated in FIG. 1) can search for office machines in a heterogeneous fleet of office machines on a network. At 220, identification data can be received from the office machines in the heterogeneous fleet of office machines at the device layer of the security control. The identification data for a given office machine can include an identifier (e.g., a model number) of the given office machine and a configuration item for the given office machine. The identification data can be received from an office machine (e.g., the second office machine 8) discovered by the device layer (e.g., the device layer 28 illustrated in FIG. 1), as well as from an office machine (e.g., the first office machine 6 illustrated in FIG. 1) that has discovered the security control. At 230, the configuration item of the identification data for each identified office machine can be translated by a translation pipeline (e.g., the translation pipeline 70 of FIG. 2) of the device layer from a specific value (e.g., a proprietary value) that varies based on a model of the office machine to an associated office machine into a normalized value to a provide translated configuration item.

At 240, an office machine record (e.g., the office machine record 74 illustrated in FIG. 2) for each identified office machine can be stored in the database by a database layer (e.g., the database layer 30 illustrated in FIG. 1) of the security control. The office machine record can include, for example, the identification data with the translated configuration item.

At 250, an office machine security policy can be generated and/or modified by a service layer (e.g., the service layer 32 illustrated in FIG. 1) in response to user input at a user interface (e.g., the user interface 34 illustrated in FIG. 1). In one example, TABLE 1 illustrates a possible implementation for the office machine security policy. At 260, a security configuration for each identified office machine can be generated based on the office machine security policy and the translated configuration item of the office machine record. At 270, the device layer can employ the translation pipeline to translate the configuration settings for each identified office machine into security instructions. At 280, the security instructions can be provided to each identified office machine and/or a computer tethered to an identified office machine. In some examples, the security instructions can be pushed to each identified office machine (or some subset thereof). Additionally or alternatively, the security instructions can be pulled by each identified office machine (or some subset thereof).

FIG. 17 illustrates another flowchart of an example method 300 for administering an office machine security policy. The method 300 can be implemented, for example, by a security control (e.g., the security control 26 illustrated in FIG. 1). At 310, identification data can be received (e.g., by the device layer 28 of FIG. 1) from each office machine in a heterogeneous fleet of office machines. At 320, a security configuration for each office machine in the heterogeneous fleet of office machines can be generated (e.g., by the service layer 32 illustrated in FIG. 1) based on an office machine security policy and the identification data for each office machine in the heterogeneous fleet of office machines. At 330, the security configuration for a given office machine in the heterogeneous fleet of office machines can be translated (e.g., by the device layer 28 illustrated in FIG. 1) into security instructions that are executable by the given office machine. The security instructions can control job execution at the given office machine.

Figure 18:
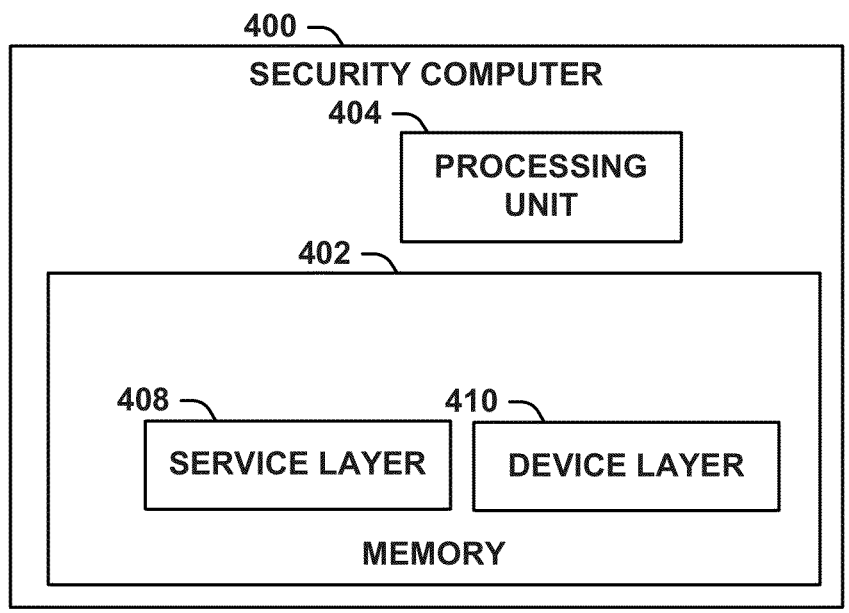
FIG. 18 illustrates another example of an office machine security computer.

FIG. 18 illustrates an example of a security computer 400. The security computer 400 can comprise a non-transitory memory 402 to store machine readable instructions. The security computer 400 can also comprise a processing unit 404 to access the memory 402 and execute the machine readable instructions. The machine readable instructions can comprise a service layer 408 to generate an office machine security policy for a heterogeneous fleet of office machines. The heterogeneous fleet of office machines can comprise two different office machines. The service layer 408 can also generate a security configuration for each office machine of the office machine fleet. The security configuration for a given office machine of the heterogeneous fleet of office machines can comprise a security setting for the given office machine. The machine readable instructions can also comprise a device layer 410 to translate the security configuration of the given office machine into security instructions that are executable by the given office machine.

What have been described above are examples. It is, of course, not possible to describe every conceivable combination of components or methods, but one of ordinary skill in the art will recognize that many further combinations and permutations are possible. Accordingly, the disclosure is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A security control system comprising:
    a memory to store machine readable instructions; and
    a processing unit to access the memory and execute the machine readable instructions, causing the security control system to:
        generate an office machine security policy for a heterogeneous fleet of office machines;
        based on the office machine security policy, generate a normalized security configuration for all of the heterogeneous fleet of office machines, wherein the normalized security configuration comprises a standard set of security settings for the heterogeneous fleet of the office machines;
        for each given office machine of the heterogeneous fleet, translate the normalized security configuration into native security instructions that are native to the given office machine to enable the given office machine to implement the security settings; and
        provide the native security instructions to the given office machine for execution.

2. The security control system of claim 1, wherein the given office machine of the heterogeneous fleet of office machines comprises a mufti-function printer.

3. The security control system of claim 1, wherein execution of the machine readable instructions further causes the security control system to:
    receive a request for the native security instructions from a security client of the given office machine; and
    provide the native security instructions to the given office machine in response to the request.

4. The security control system of claim 1, wherein execution of the machine readable instructions further causes the security control system to:
    discover a subset of office machines in the heterogeneous fleet of office machines; and
    query each respective office machine in the subset of office machines for identification data, the identification data comprising an identifier and a configuration item for the respective office machine.

5. The security control system of claim 1, wherein the execution of the machine readable instructions further causes the security control system to:
    enable discovery of the security control system by a subset of office machines in the heterogeneous fleet of office machines; and
    receive identification data for each office machine in the subset of office machines, the identification data comprising an identifier and a configuration item for the respective office machine.

6. The security control system of claim 1, wherein execution of the machine readable instructions further causes the security control system to:
    discover a first subset of office machines in the heterogeneous fleet of office machines;
    enable discovery of the security control system by a second subset of office machines in the heterogeneous fleet of office machines; and
    receive identification data from each respective office machine in the first and the second subsets of office machines, the identification data comprising an identifier and a configuration item for the respective office machine in the first and the second subsets of office machines.

7. The security control system of claim 1, further comprising a graphical user interface (GUI) to facilitate generation and modification of the office machine security policy.

8. The security control system of claim 1, wherein the office machine security policy comprises a security setting requiring each office machine in the heterogeneous fleet of office machines to request user authentication prior to executing a job.

9. The security control system of claim 1, wherein the office machine security policy comprises an unsupported value for a corresponding security setting to indicate that if the given office machine of the heterogeneous fleet of office machines does not support the corresponding security setting, then the given office machine is to ignore the corresponding security setting.

10. The security control system of claim 1, wherein the native security instructions for the given office machine comprises a set of Simple Network Management Protocol (SNMP) instructions.

11. The security control system of claim 1, wherein execution of the machine readable instructions further causes the security control system to:
store, in a database, an office machine security policy record comprising the office machine security policy; and
store, in the database, an office machine record for the given office machine, the office machine record comprising the translated normalized security configuration of the given office machine and identifying information for the given office machine.

12. A method comprising:
receiving identification data from each given office machine in a heterogeneous fleet of office machines;
generating an office machine security policy for the heterogeneous fleet of office machines;
based on the office machine security policy, generating a normalized security configuration for all of the heterogeneous fleet of office machines, wherein the normalized security configuration comprises a standard set of security settings for the heterogeneous fleet of office machines;
for each given office machine of the heterogeneous fleet, translating the normalized security configuration for the given office machine into native security instructions that are native to the given office machine to enable the given office machine to implement the security settings, wherein the native security instructions control job execution at the given office machine; and
providing the native security instructions to the given office machine for execution.

13. The method of claim 12, further comprising:
searching a network for a subset of the heterogeneous fleet of office machines.

14. The method of claim 13, further comprising:
enabling the subset of the heterogeneous fleet of office machines to discover a security control that generates the office machine security policy.

15. The method of claim 13, further comprising:
querying each respective office machine in the subset of office machines for identification data, the identification data comprising an identifier and a configuration item for each respective office machine in the subset of office machines.

16. The method of claim 12, further comprising:
for each given office machine, translating a configuration item of the identification data from a proprietary value that varies based on a model of the given office machine, into a normalized value comprising a common nomenclature for all of the heterogeneous fleet of office machines.

17. The method of claim 12, wherein the given office machine comprises a mufti-function printer.

18. The method of claim 12, further comprising:
receiving a request for the native security instructions from a security client of the given office machine; and
providing the native security instructions to the given office machine in response to the request.

19. The method of claim 12, further comprising:
storing, in a database, an office machine security policy record comprising the office machine security policy; and
storing, in the database, an office machine record for the given office machine, the office machine record comprising the translated normalized security configuration of the given office machine.

20. A non-transitory computer readable medium storing machine readable instructions that, when executed by one or more processors of a security control system, cause the security control system to:
search a network for a subset of office machines in a heterogeneous fleet of office machines, the subset of office machines comprising a first printer of a first type and a second printer of a second type that is different from the first type;
receive identification data from the first and the second printers, the identification data comprising an identifier and a configuration item for each of the first and the second printers, the configuration item identifying a respective configurable function of the first and the second printers;
translate the configuration item for the first printer from a proprietary value, native to the first printer, to a normalized value comprising a common nomenclature for the heterogeneous fleet of office machines;
translate the configuration item for the second printer from a proprietary value, native to the second printer, to the normalized value;
generate an office machine security policy for the heterogeneous fleet of office machines in response to user input at a user interface;
generate a normalized security configuration for all of the subset of office machines based on the office machine security policy, the normalized security configuration comprising a standard set of security settings for controlling access to each of the subset of office machines;
translate the normalized security configuration into a first set of security instructions native to the first printer, wherein the first set of security instructions control job execution at the first printer; and
translate the normalized security configuration into a second set of security instructions native to the second printer, wherein the second set of security instructions control job execution at the second printer;
provide the first set of security instructions to the first printer for execution in response to a request from the first printer; and
provide the second set of security instructions to the second printer for execution in response to a request from the second printer.

* * * * *

UNITED STATES PATENT AND TRADEMARK OFFICE
CERTIFICATE OF CORRECTION

| | |
|---|---|
| PATENT NO. | : 9,189,636 B2 |
| APPLICATION NO. | : 13/561644 |
| DATED | : November 17, 2015 |
| INVENTOR(S) | : Matthew Lee Deter et al. |

It is certified that error appears in the above-identified patent and that said Letters Patent is hereby corrected as shown below:

IN THE CLAIMS

In column 20, line 30, in Claim 2, delete "mufti" and insert -- multi --, therefor.

In column 22, line 9 approx., in Claim 17, delete "mufti" and insert -- multi --, therefor.

Signed and Sealed this
Fifth Day of April, 2016

Michelle K. Lee
*Director of the United States Patent and Trademark Office*